United States Patent
Morii et al.

(12)

(10) Patent No.: US 7,094,814 B2
(45) Date of Patent: *Aug. 22, 2006

(54) COLORING COMPOSITION FOR COLOR FILTER CONTAINING COLORANT AND COLOR FILTER USING THE SAME

(75) Inventors: Hiroko Morii, Hiroshima (JP); Keisuke Iwasaki, Hiroshima (JP); Kazuyuki Hayashi, Hiroshima (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 169 days.

This patent is subject to a terminal disclaimer.

(21) Appl. No.: 10/253,906

(22) Filed: Sep. 25, 2002

(65) Prior Publication Data

US 2003/0116758 A1    Jun. 26, 2003

Related U.S. Application Data

(63) Continuation-in-part of application No. 10/160,297, filed on Jun. 4, 2002, now Pat. No. 6,623,557, and a continuation-in-part of application No. 09/940,866, filed on Aug. 29, 2001.

(30) Foreign Application Priority Data

| Sep. 1, 2000 | (JP) | ............................ 2000-265758 |
| Mar. 30, 2001 | (JP) | ............................ 2001-101082 |
| Jun. 5, 2001 | (JP) | ............................ 2001-170199 |
| Sep. 27, 2001 | (JP) | ............................ 2001-298682 |
| Mar. 5, 2002 | (JP) | ............................ 2002-059439 |
| Mar. 5, 2002 | (JP) | ............................ 2002-059464 |

(51) Int. Cl.
*C08K 3/20*    (2006.01)
*C08K 9/00*    (2006.01)

(52) U.S. Cl. .................... 523/200; 524/430; 524/437; 524/492; 524/493; 349/1

(58) Field of Classification Search ............... 524/430, 524/437, 492, 493; 523/200
See application file for complete search history.

(56) References Cited

U.S. PATENT DOCUMENTS

| 5,378,574 | A | * | 1/1995 | Winnik et al. ............... 430/115 |
| 6,344,300 | B1 | * | 2/2002 | Baba et al. ..................... 430/7 |
| 6,623,577 | B1 | * | 9/2003 | Ogawa et al. ................. 156/64 |
| 6,627,364 | B1 | * | 9/2003 | Kiguchi et al. ................. 430/7 |

OTHER PUBLICATIONS

Database WPI, Section Ch, Week 199849, Derwent Publications Ltd., London, GB; AN 1998-578006; XP002304430 & JP 10 260310 A (Nippon Gosei Gomu KK) Sep. 29, 1998.

* cited by examiner

*Primary Examiner*—Tae H. Yoon
(74) *Attorney, Agent, or Firm*—Nixon & Vanderhye P.C.

(57) ABSTRACT

A coloring composition for a color filter composed of composite particles having an average particle diameter of 0.00 1 to 1.0 μm, and containing white inorganic particles, a glue coating layer formed on the surface of the white inorganic particle and an organic pigment coat formed on the glue. A dispersant, binder resin, monomer as a reactive diluent, a polymerization initiator and a solvent are also present. The colorant provides not only a sharp particle size distribution but also excellent light resistance.

13 Claims, 2 Drawing Sheets

COLORING COMPOSITION FOR COLOR FILTER CONTAINING COLORANT AND COLOR FILTER USING THE SAME

CROSS REFERENCES TO RELATED APPLICATION

This is a continuation-in-part of applications, Ser. No. 09/940,866 filed Aug. 29, 2001 and Ser. No. 10/160,297 filed Jun. 4, 2002 now U.S. Pat. No. 6,623,557.

BACKGROUND OF THE INVENTION

The present invention relates to a coloring composition for color filter containing a colorant and a color filter using the coloring composition, and more particularly, to a coloring composition for color filter containing a colorant exhibiting not only a sharp particle size distribution but also excellent light resistance, and a color filter using such a coloring composition, which exhibits excellent spectral properties.

In the recent computerized society, various information devices such as personal computers or the like have rapidly spread in any of business, personal and domestic applications. These information devices are almost provided with a display as one of terminal equipments thereof. In particular, since portable-type information devices are required to have a lightweight and a small size for space-saving, a liquid crystal display (LCD) devices, especially color LCD devices, have been used therein.

A color filter is essential to express the information by the color LCD devices. The color filter is an optical filter constituted by three primary colors of either R (red), G (green) and B (blue) or C (cyan), Y (yellow) and M (magenta) regularly arranged on a glass plate.

The color LCD devices have been first required to show a good color property (color-reproducing property), a high lightness and a large contrast. With these requirements, the color filter used in the color LCD devices have also been required to have a higher performance as to color property (color-reproducing property), a lightness and a contrast thereof.

The color property of the color filter can be improved by increasing a concentration of pigments contained therein so as to enhance its color density. However, the increased pigment concentration causes the deterioration in light transmittance of the color filter. Therefore, in general, the color property of the color filter has been improved by enhansing a color purity of a colorant used in the color filter, i.e., by using a colorant having a narrower transmission spectrum.

In order to obtain a colorant having a high color purity, there has been generally used the method of mixing the respective three primary colors R (red), G (green) and B (blue) with corresponding complementary colors, i.e., a so-called subtractive color mixing method (Japanese Patent Application Laid-Open (KOKAI) Nos. 8-295808(1996), 8-295809(1996) and 2001-188120, etc.).

In order to enhance a lightness of the color filter, pigments used in the color filter are required to have a high transparency and an excellent dispersibility.

Hitherto, dyes have been used as a colorant for the color filter from the standpoints of transparency, fluidity, dispersibility and the like. However, these dyes are chemically active and, therefore, deteriorated in fastness such as light resistance. For this reason, in recent years, pigments are mainly used as the colorant of the color filter.

However, since the pigments are in the form of particles unlike dyes dissolvable in vehicle, when such pigments are used, it has been difficult to obtain color filters having a high transparency corresponding to that of color filters using the dyes. In order to improve the transparency, there has been proposed the method of filling up colloid particles having a particle size of less than 100 nm between colorants having a particle size of more than 200 nm (Japanese Patent Application Laid-Open (KOKAI) No. 2001-126635).

Also, in the case of organic pigments, from pigments kept in a molecular state to pigments composed of fine primary particles having a particle size of about 20 to 100 nm are produced by the chemical reaction or the like. However, the fine primary particles or the like have a very high surface energy and, therefore, tend to be agglomerated together. As a result, the fine primary particles or the like are usually formed into aggregates, i.e., secondary particles having a very large particle size. For this reason, it has been required to develop techniques for obtaining finely divided pigments.

As the method of obtaining finely divided pigments, there are known a method of controlling crystal growth of pigments during the production process thereof; a method of mechanically pulverizing the pigments; or the like. However, in any of these methods, the obtained pigments tend to have a broader particle size distribution and an uninformed particle shape, resulting in tendencies of deteriorated contrast due to light scattering as well as poor dispersibility in vehicle.

For these reasons, there has been required a colorant for color filter, which has a fine particle size and a sharp particle size distribution.

Conventionally, in order to obtain color filters having excellent light transmittance and contrast, there have been proposed the methods using pigments having a specific particle size (Japanese Patent Publication (KOKOKU) Nos. 4-37987(1992) and 4-39041(1992), Japanese Patent Application Laid-Open (KOKAI) No. 9-197118(1997), etc.).

In addition, the color filters have been required to show a high reliability upon outdoor use, such as a high light resistance.

At present, it has been strongly required to provide a color filter having excellent spectral properties, using a colorant for color filter capable of exhibiting not only a sharp particle size distribution but also excellent transparency. However, the conventional colorants have failed to satisfy these requirements.

That is, in Japanese Patent Application Laid-Open (KOKAI) Nos. 8-295808(1996), 8-295809(1996) and 2001-188120, there is described the method of improving spectral properties of the color filter by a subtractive color mixing method using pigments having a specific particle size therein. However, since the pigments used have a broad particle size distribution, the spectral properties of the color filter cannot be sufficiently improved.

Also, in Japanese Patent Application Laid-Open (KOKAI) No. 2001-126635, there is described the method of improving the transparency by filling up colloid particles having a particle size of less than 100 nm between colorants having a particle size of more than 200 nm. However, the adhesion strength between the colloid particles and the colorant is insufficient, thereby causing deterioration of dispersibility in vehicle and failing to obtain the effect of sufficiently improving the transparency.

In Japanese Patent Publication (KOKOKU) Nos. 4-37987 (1992) and 4-39041(1992) and Japanese Patent Application Laid-Open (KOKAI) No. 9-197118(1997), there is described the method of using pigment particles having a specific particle size. However, since the reduction of the particle size of the pigment particles is conducted by mechanical pulverization, the obtained particles failed to show a uniform particle shape and a sufficiently sharp particle size distribution.

Meanwhile, in Japanese Patent Application Laid-Open (KOKAI) No. 2001-226609, there are described green-based pigments composed of green composite iron oxide hydroxide particles comprising iron oxide hydroxide particles; a coating layer formed on the surface of the iron oxide hydroxide particle, which comprises organosilane compounds obtainable from alkoxysilanes, or polysiloxanes; an organic blue pigment coat formed on the coating layer. However, the technique described in this KOKAI is to fixedly adhere the organic blue pigments onto the yellow iron oxide hydroxide particles and, therefore, is quite different from the technique of the present invention for obtaining the organic pigments having a high chroma. Further, in this KOKAI, there is neither taught nor suggested the motivation for applying the green-based pigments to a colorant for color filter.

As a result of the present inventors' earnest studies for solving the above problems, it has been found that by using a colorant composed of composite particles having an average particle diameter of 0.001 to 1.0 μm, which comprise white inorganic particles, a gluing agent coating layer formed on the surface of the white inorganic particle and an organic pigment coat formed onto the gluing agent coating layer, and exhibits not only a sharp particle size distribution but also excellent light resistance, the obtained color filter exhibits excellent spectral properties. The present invention has been attained on the basis of the findings.

SUMMARY OF THE INVENTION

An object of the present invention is to provide a coloring composition for color filter, exhibiting an excellent dispersibility, which contains a colorant for color filter having not only a sharp particle size distribution but also an excellent light resistance.

Another object of the present invention is to provide a color filter exhibiting excellent spectral properties, which contains a colorant for color filter having not only a sharp particle size distribution but also an excellent light resistance.

A further object of the present invention is to provide a colorant for color filter, which exhibits not only a sharp particle size distribution but also an excellent light resistance.

To accomplish the aim, in a first aspect of the present invention, there is provided a coloring composition for a color filter, comprising:

a colorant for a color filter composed of composite particles having an average particle diameter of 0.001 to 1.0 μm, and comprising white inorganic particles, a gluing agent coating layer formed on surface of the white inorganic particle and an organic pigment coat formed on the gluing agent coating layer in an amount of 1 to 500 parts by weight based on 100 parts by weight of the white inorganic particles;

a dispersant; a binder resin; a monomer as a reactive diluent; a polymerization initiator; and a solvent.

In a second aspect of the present invention, there is provided a coloring composition for a color filter, comprising:

a colorant for a color filter composed of composite particles having an average particle diameter of 0.001 to 1.0 μm, and comprising white inorganic particles coated with at least one under-coating material selected from the group consisting of hydroxides of aluminum, oxides of aluminum, hydroxides of silicon and oxides of silicon, a gluing agent coating layer formed on the coated white inorganic particle and an organic pigment coat formed on the gluing agent coating layer in an amount of 1 to 500 parts by weight based on 100 parts by weight of the white inorganic particles;

a dispersant; a binder resin; a monomer as a reactive diluent; a polymerization initiator; and a solvent.

In a third aspect of the present invention, there is provided a coloring composition for a color filter, comprising:

a colorant for a color filter composed of composite particles having an average particle diameter of 0.0015 to 0.5 μm, a geometrical standard deviation value of particle diameters of not more than 1.8 and a BET specific surface area value of 1.5 to 750 $m^2/g$, and comprising white inorganic particles, a gluing agent coating layer formed on surface of the white inorganic particle, and an organic pigment coat formed on the gluing agent coating layer in an amount of 10 to 400 parts by weight based on 100 parts by weight of the white inorganic particles;

a dispersant; a binder resin; a monomer as a reactive diluent; a polymerization initiator; and a solvent.

In a fourth aspect of the present invention, there is provided a coloring composition for a color filter, comprising:

a colorant for a color filter composed of composite particles having an average particle diameter of 0.0015 to 0.5 μm, a geometrical standard deviation value of particle diameters of not more than 1.8 and a BET specific surface area value of 1.5 to 750 $m^2/g$, and comprising white inorganic particles coated with at least one under-coating material selected from the group consisting of hydroxides of aluminum, oxides of aluminum, hydroxides of silicon and oxides of silicon, a gluing agent coating layer formed on the coated white inorganic particle, and an organic pigment coat formed on the gluing agent coating layer in an amount of 10 to 400 parts by weight based on 100 parts by weight of the white inorganic particles;

a dispersant; a binder resin; a monomer as a reactive diluent; a polymerization initiator; and a solvent.

In a fifth aspect of the present invention, there is provided a color filter having pixel (picture elements) obtained by applying onto a substrate a coloring composition for a color filter, which coloring composition comprises:

a colorant for a color filter composed of composite particles having an average particle diameter of 0.001 to 1.0 μm, and comprising white inorganic particles, a gluing agent coating layer formed on the surface of the white inorganic particle and an organic pigment coat formed on the gluing agent coating layer in an amount of 1 to 500 parts by weight based on 100 parts by weight of the white inorganic particles;

a dispersant; a binder resin; a monomer as a reactive diluent; a polymerization initiator; and a solvent.

In a sixth aspect of the present invention, there is provided a color filter having pixel (picture elements) obtained by applying onto a substrate a coloring composition for a color filter, which coloring composition comprises:

a colorant for a color filter composed of composite particles having an average particle diameter of 0.001 to 1.0 μm, and comprising white inorganic particles coated with at least one under-coating material selected from the group consisting of hydroxides of aluminum, oxides of aluminum, hydroxides of silicon and oxides of silicon, a gluing agent coating layer formed on the coated white inorganic particle and an organic pigment coat formed on the gluing agent coating layer in an amount of 1 to 500 parts by weight based on 100 parts by weight of the white inorganic particles;

a dispersant; a binder resin; a monomer as a reactive diluent; a polymerization initiator; and a solvent.

In a seventh aspect of the present invention, there is provided a method of using as a colorant for a color filter, composite particles having an average particle diameter of 0.001 to 1.0 μm, and comprising white inorganic particles, a gluing agent coating layer formed on surface of the white inorganic particle and an organic pigment coat formed on the gluing agent coating layer in an amount of 1 to 500 parts by weight based on 100 parts by weight of the white inorganic particles.

In an eighth aspect of the present invention, there is provided a method of using as a colorant for a color filter, composite particles having an average particle diameter of 0.001 to 1.0 μm, and comprising white inorganic particles coated with at least one under-coating material selected from the group consisting of hydroxides of aluminum, oxides of aluminum, hydroxides of silicon and oxides of silicon, a gluing agent coating layer formed on the coated white inorganic particle and an organic pigment coat formed on the gluing agent coating layer in an amount of 1 to 500 parts by weight based on 100 parts by weight of the white inorganic particles.

DETAILED DESCRIPTION OF THE INVENTION

Figure 1:
FIG. 1 is a micrograph (×50,000) of silica particles used in Example 1.

The present invention will now be described in detail below.

First, the colorant for color filter used in the present invention is described.

The colorant for color filter used in the present invention is composed of composite particles having an average particle diameter of 0.001 to 1.0 μm, which comprise white inorganic particles as core particles, a gluing agent coating layer formed on the surface of the respective core particles, and an organic pigment coat formed onto the gluing agent coating layer.

The white inorganic particles used in the present invention may be those having a hiding power of usually not more than 600 cm²/g. Examples of the white inorganic particles may include white pigments, extender pigments or the like. As the white pigments, there may be exemplified titanium dioxide, zinc oxide or the like. As the extender pigments, there may be exemplified fine silica particles such as silica powder, white carbon, fine silicic acid powder and diatomaceous earth particles; clay particles; calcium carbonate particles; barium sulfate particles; alumina white particles; talc; transparent titanium oxide particles; or the like. Among these white inorganic particles, preferred are the extender pigments, more preferred are those extender pigments having a refractive index of not more than 3.0, and still more preferred are those extender pigments having a refractive index of 1.0 to 2.1.

The white inorganic particles may be those having any suitable shape such as spherical particles, granular particles, polyhedral particles, acicular particles, spindle-shaped particles, rice ball-shaped particles, flake-shaped particles, scale-shaped particles and plate-shaped particles.

The white inorganic particles have an average particle size of usually 0.0009 to 0.99 μm, preferably 0.0014 to 0.49 μm, more preferably 0.0019 to 0.19 μm. When the average particle size of the white inorganic particles is more than 0.99 μm, the obtained colorant may become coarse, resulting in poor tinting strength and deteriorated transparency.

The white inorganic particles used in the present invention have a hiding power of usually not more than 600 cm²/g. Further, in the consideration of a good transparency of the obtained colorant for color filter, the hiding power of the white inorganic particles is preferably not more than 300 cm²/g, more preferably 1 to 100 cm²/g.

The refractive index of the white inorganic particles used in the present invention is not particularly limited as long as the hiding power thereof falls within the above-specified range. In the consideration of the refractive index of the organic pigments coat above the white inorganic particles, which generally falls within the range of 1.2 to 2.5, the white inorganic particles preferably have a refractive index of 1.1 to 3.0. Also, in the consideration of the refractive index of a binder resin used for production of the coloring composition, which generally falls within the range of 1.4 to 1.7, the white inorganic particles have a refractive index of more preferably 1.2 to 2.0, still more preferably 1.3 to 1.8.

The white inorganic particles used in the present invention have a geometrical standard deviation value of particle diameters of preferably not more than 2.0, more preferably not more than 1.8, still more preferably not more than 1.5. When the geometrical standard deviation value of particle diameters of the white inorganic particles is more than 2.0, the obtained colorant for color filter also may show a broad particle size distribution, resulting in deteriorated contrast due to scattering of light. In the consideration of industrial productivity, the lower limit of the geometrical standard deviation value of particle diameters of the white inorganic particles is 1.01.

The white inorganic particles have a BET specific surface area value of usually not less than 0.5 m²/g. When the BET specific surface area value is less than 0.5 m²/g, the white inorganic particles may become coarse, or sintering tends to be caused within or between the white inorganic particles, so that the obtained colorant may also become coarse and, therefore, tends to be deteriorated in tinting strength and transparency. In the consideration of good tinting strength and transparency of the obtained colorant for color filter, the BET specific surface area value of the white inorganic particles is preferably not less than 1.0 m²/g, more preferably not less than 1.5 m²/g. In addition, in the consideration of forming a uniform gluing agent coating layer on the surface of the white inorganic particle or a uniform organic pigment coat onto the surface of the gluing agent coating layer, the upper limit of the BET specific surface area value of the white inorganic particles is usually 1,000 m²/g, preferably 750 m²/g, more preferably 500 m²/g.

As to the hue of the white inorganic particles, the L* value thereof is usually not less than 70.00, preferably not less than 75.00; and the C* value thereof is usually not more than 18.00, preferably not more than 15.00, more preferably not more than 12.00. When the L* and C* values of the white inorganic particles is out of the above-specified ranges, it may be difficult to obtain the aimed colorant for color filter exhibiting a clear white color.

As to the light resistance of the white inorganic particles, the lower limit of the ΔE* value thereof when measured by the below-mentioned evaluation method, is usually more than 5.0; and the upper limit of the ΔE* value thereof is usually 12.0, preferably 11.0, more preferably 10.0.

The gluing agent used in the present invention may be of any kind as long as the organic pigment can be adhered onto the surface of the white inorganic particle as the core particle therethrough. Examples of the preferred gluing agents may include organosilicon compounds such as alkoxysilanes, fluoroalkylsilanes and polysiloxanes; various coupling agents such as silane-based coupling agents, titanate-based coupling agents, aluminate-based coupling agents and zirconate-based coupling agents; oligomer compounds; polymer compounds or the like. These gluing agents may be used alone or in the form of a mixture of any two or more thereof. In the consideration of adhesion strength of the organic pigment onto the surface of the white inorganic particle as the core particle through the gluing agent, the more preferred gluing agents are the organosilicon compounds such as alkoxysilanes, fluoroalkylsilanes and polysiloxanes, and various coupling agents such as silane-based coupling agents, titanate-based coupling agents, aluminate-based coupling agents and zirconate-based coupling agents.

In particular, in the case where fine silica particles are used as the white inorganic particles, it is preferable to use the organosilicon compounds or the silane-based coupling agents as the gluing agent.

As organosilicon compounds used in the present invention, at least one organosilicon compound selected from the group consisting of (1) organosilane compounds obtained from alkoxysilane compounds; (2) polysiloxanes, or modified polysiloxanes selected from the group consisting of (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group (hereinafter referred to merely as "terminal-modified polysiloxanes"),; and (3) fluoroalkyl organosilane compounds obtained from fluoroalkylsilane compounds.

The organosilane compounds (1) can be produced from alkoxysilane compounds represented by the formula (I):

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

Specific examples of the alkoxysilane compounds may include methyltriethoxysilane, dimethyldiethoxysilane, phenyltriethyoxysilane, diphenyldiethoxysilane, dimethyldimethoxysilane, methyltrimethoxysilane, phenyltrimethoxysilane, diphenyldimethoxysilane, isobutyltrimethoxysilane, decyltrimethoxysilane or the like.

Among these alkoxysilane compounds, in view of the adhering strength of the organic pigments, methyltriethoxysilane, methyltrimethoxysilane, dimethyldimethoxysilane, isobutyltrimethoxysilane and phenyltriethyoxysilane are preferred, and methyltriethoxysilane, methyltrimethoxysilane and phenyltriethyoxysilane are more preferred.

As the polysiloxanes (2), there may be used those compounds represented by the formula (II):

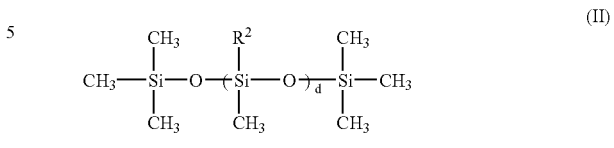

wherein $R^2$ is H— or $CH_3$—, and d is an integer of 15 to 450.

As the modified polysiloxanes (2-A), there may be used:
(a1) polysiloxanes modified with polyethers represented by the formula (III):

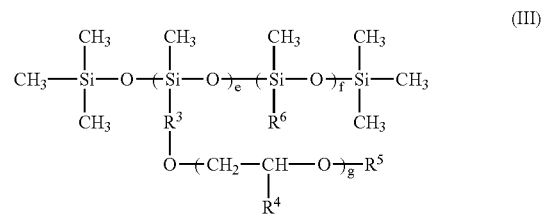

wherein $R^3$ is —$(—CH_2—)_h$—; $R^4$ is —$(—CH_2—)_i$—$CH_3$; $R^5$ is —OH, —COOH, —CH=$CH_2$, —CH($CH_3$)=$CH_2$ or —$(—CH_2—)_j$—$CH_3$; $R^6$ is —$(—CH_2—)_k$—$CH_3$; g and h are an integer of 1 to 15; i, j and k are an integer of 0 to 15; e is an integer of 1 to 50; and f is an integer of 1 to 300;
(a2) polysiloxanes modified with polyesters represented by the formula (IV):

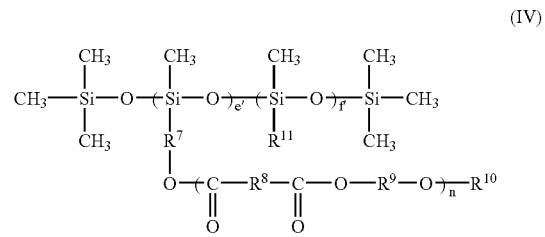

wherein $R^7$, $R^8$ and $R^9$ are —$(—CH_2—)_q$— and may be the same or different; $R^{10}$ is —OH, —COOH, —CH=$CH_2$, —CH($CH_3$)=$CH_2$ or —$(—CH_2—)_r$—$CH_3$; $R^{11}$ is —$(—CH_2—)_s$—$CH_3$; n and q are an integer of 1 to 15; r and s are an integer of 0 to 15; e' is an integer of 1 to 50; and f' is an integer of 1 to 300;
(a3) polysiloxanes modified with epoxy compounds represented by the formula (V):

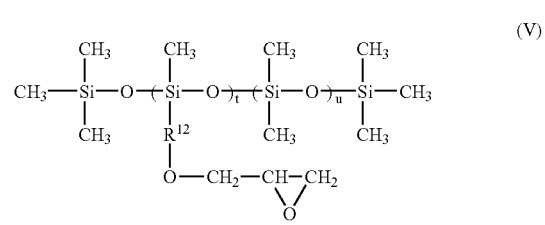

wherein $R^{12}$ is —$(—CH_2—)_v$—; v is an integer of 1 to 15; t is an integer of 1 to 50; and u is an integer of 1 to 300; or a mixture thereof.

As the terminal-modified polysiloxanes (2-B), there may be used those represented by the formula (VI):

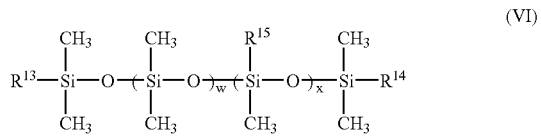

wherein $R^{13}$ and $R^{14}$ are —OH, $R^{16}$OH or $R^{17}$COOH and may be the same or different; $R^{15}$ is —CH$_3$ or —C$_6$H$_5$; $R^{16}$ and $R^{17}$ are —(—CH$_2$—)$_y$—; wherein y is an integer of 1 to 15; w is an integer of 1 to 200; and x is an integer of 0 to 100.

In view of the adhering strength of the organic pigment, polysiloxanes having methyl hydrogen siloxane units, the polysiloxanes modified with the polyethers and the polysiloxanes whose terminals are modified with carboxylic acid groups are preferred.

The fluoroalkyl organosilane compounds (3) may be produced from fluoroalkylsilane compounds represented by the formula (VII):

wherein $R^{18}$ is CH$_3$—, C$_2$H$_5$—, CH$_3$O— or C$_2$H$_5$O—; X is CH$_3$O— or C$_2$H$_5$O—; and z is an integer of 0 to 15; and a' is an integer of 0 to 3.

Specific examples of the fluoroalkylsilane compounds may include trifluoropropyl trimethoxysilane, tridecafluorooctyl trimethoxysilane, heptadecafluorodecyl trimethoxysilane, heptadecafluorodecylmethyl dimethoxysilane, trifluoropropyl ethoxysilane, tridecafluorooctyl triethoxysilane, heptadecafluorodecyl triethoxysilane, or the like.

Among these fluoroalkylsilane compounds, in view of the adhering strength of the organic pigment, trifluoropropyl trimethoxysilane, tridecafluorooctyl trimethoxysilane and heptadecafluorodecyl trimethoxysilane are preferred, and trifluoropropyl trimethoxysilane and tridecafluorooctyl trimethoxysilane are more preferred.

As the silane-based coupling agents, there may be exemplified vinyltrimethoxysilane, vinyltriethoxysilane, γ-aminopropyltriethoxysilane, γ-glycidoxypropyltrimethoxysilane, γ-mercaptopropyltrimethoxysilane, γ-methacryloxypropyltrimethoxysilane, N-β (aminoethyl)-γ-aminopropyltrimethoxysilane, γ-glycidoxypropylmethyldimethoxysilane, γ-chloropropyltrimethoxysilane or the like.

As the titanate-based coupling agents, there may be exemplified isopropyltristearoyl titanate, isopropyltris(dioctylpyrophosphate)titanate, isopropyltri(N-aminoethyl-aminoethyl)titanate, tetraoctylbis(ditridecylphosphate)titanate, tetra(2,2-diaryloxymethyl-1-butyl)bis(ditridecyl)phosphate titanate, bis(dioctylpyrophosphate)oxyacetate titanate, bis(dioctylpyrophosphate)ethylene titanate or the like.

As the aluminate-based coupling agents, there may be exemplified acetoalkoxyaluminum diisopropilate, aluminumdiisopropoxymonoethylacetoacetate, aluminumtrisethylacetoacetate, aluminumtrisacetylacetonate or the like.

As the zirconate-based coupling agents, there may be exemplified zirconiumtetrakisacetylacetonate, zirconiumdibutoxybisacetylacetonate, zirconiumtetrakisethylacetoacetate, zirconiumtributoxymonoethylacetoacetate, zirconiumtributoxyacetylacetonate or the like.

It is preferred to use oligomer compounds having a molecular weight of from 300 to less than 10,000. It is preferred to use polymer compounds having a molecular weight of about 10,000 to about 100,000. In the consideration of forming a uniform coating layer on the core particles, the oligomers or polymer compounds are preferably in a liquid state, or soluble in water or various solvents.

The amount of the gluing agent coating layer is preferably 0.01 to 15.0% by weight, more preferably 0.02 to 12.5% by weight, still more preferably 0.03 to 10.0% by weight (calculated as C) based on the weight of the gluing agent-coated core particles.

When the amount of the gluing agent-coating layer is less than 0.01% by weight, it may be difficult to adhere not less than one part by weight of the organic pigment based on 100 parts by weight of the white inorganic particles. When the amount of the gluing agent-coating layer is more than 15.0% by weight, since it is possible to adhere 1 to 500 parts by weight of the organic pigment onto 100 parts by weight of the core particles therethrough, it is unnecessary to form the gluing agent-coating layer in an amount of more than 15.0% by weight.

As the organic pigments used in the present invention, there may be used those organic pigments capable of exhibiting a hue required for the color filter, i.e., either (a) red, green and blue or (b) cyan, magenta and yellow. Examples of the organic pigments may include various organic pigments such as organic red-based pigments, organic green-based pigments, organic blue-based pigments and organic yellow-based pigments. Also, in order to enhance spectral properties of the color filter, complementary color organic pigments, for example, in case of organic blue-based pigments, organic violet-based pigments, may be used in combination with the above organic pigments.

Examples of the organic red-based pigments may include quinacridon pigments such as quinacridon red, anthraqunone-based pigments such as diaminoanthraqunonyl red, azo-based pigments such as permanent red, condensed azo pigments such as condensed azo red, perylene pigments such as perylene red, or the like.

Examples of the organic green-based pigments may include phthalocyanine-based pigments such as phthalocyanine green, or the like.

Examples of the organic blue-based pigments may include phthalocyanine-based pigments such as metal-free phthalocyanine blue, phthalocyanine blue and fast sky blue, alkali blue, or the like.

Examples of the organic yellow-based pigments may include monoazo-based pigments such as Hanza yellow, disazo-based pigments such as benzidine yellow and permanent yellow, condensed azo pigments such as condensed azo yellow, isoindoline-based pigments such as isoindoline yellow, isoindolinone-based pigments such as isoindolinon yellow or the like.

Examples of the organic violet-based pigments may include dioxazine-based pigments such as dioxazine violet, or the like.

The amount of the organic pigments coat is usually 1 to 500 parts by weight, preferably 10 to 400 parts by weight, more preferably 20 to 300 parts by weight based on 100 parts by weight of the white inorganic particles.

When the amount of the organic pigments coat is less than one part by weight or more than 500 parts by weight, it may be difficult to obtain the aimed colorant for color filter used in the present invention.

The particle shape and particle size of the colorant for color filter may largely depend upon those of the white inorganic particles as core particles, and have a particle configuration similar to that of the core particles.

Specifically, the colorant for color filter used in the present invention has an average particle diameter of usually 0.001 to 1.0 µm, preferably 0.0015 to 0.5 µm, more preferably 0.0020 to 0.2 µm.

When the average particle diameter of the colorant for color filter is more than 1.0 µm, the tinting strength and transparency thereof may be deteriorated because of too large particle size thereof. When the average particle diameter of the colorant is less than 0.001 µm, it may become difficult to disperse the colorant in vehicle.

The colorant for color filter has a geometrical standard deviation value of particle diameters of preferably not more than 2.0, more preferably not more than 1.8, still more preferably not more than 1.5. When the geometrical standard deviation value of particle diameters of the colorant is more than 2.0, the obtained colorant may tend to show a too broad particle size distribution, resulting in deteriorated contrast due to scattering of light. In the consideration of industrial productivity, the lower limit of the geometrical standard deviation value of particle diameters of the colorant is preferably 1.01.

The colorant for color filter used in the present invention have a BET specific surface area value of usually 1.0 to 1,000 m$^2$/g, preferably 1.5 to 750 m$^2$/g, more preferably 2.0 to 500 m$^2$/g. When the BET specific surface area value is less than 1.0 m$^2$/g, the obtained colorant for color filter may become coarse particles, or sintering thereof may be caused within or between the particles, so that the tinting strength and transparency of the colorant may be deteriorated.

The degree of desorption of the organic pigments from the colorant for color filter used in the present invention is preferably the rank 5 or 4, more preferably the rank 5 when visually observed and evaluated by the below-mentioned method. When the degree of desorption of the organic pigments is the rank 1, 2 or 3, uniform dispersion of the colorant in vehicle tends to be inhibited by the desorbed organic pigments, or the desorbed organic pigments may undergo self-agglomeration or crystal growth, resulting in deteriorated contrast due to scattering of light.

The tinting strength of the colorant for color filter used in the present invention is preferably not less than 110%, more preferably not less than 115%, still more preferably not less than 120% when measured by the below-mentioned evaluation method.

The colorant for color filter used in the present invention has a hiding power of preferably less than 600 cm$^2$/g, more preferably not more than 550 cm$^2$/g, still more preferably not more than 500 cm$^2$/g.

As to the light resistance of the colorant for color filter used in the present invention, the ΔE* value thereof is preferably not more than 5.0, more preferably not more than 4.0 when measured by the below-mentioned evaluation method.

Meanwhile, in the colorant for color filter used in the present invention, a plurality of colored coat layers each composed of the gluing agent coating layer and the organic pigment coat may be formed on the surface of the respective white inorganic particles as core particles. For example, the first colored coat layer composed of the gluing agent coating layer and the organic pigment coat may be formed on the surface of the white inorganic particles, and then the second colored coat layer composed of the gluing agent coating layer and the organic pigment coat may be further formed on the first colored coat layer. If required, additional colored coat layers may be formed thereon.

In the colorant for color filter having a plurality of colored coat layers, the amounts of the organic pigments adhered for forming the respective colored coat layers may be appropriately selected depending upon aimed hue and properties of the obtained colorant such that the total amount thereof does not exceed the above-specified upper limit.

In the colorant for color filter used in the present invention, if required, the surface of the respective white inorganic particles as core particle may be previously coated with at least one coating material selected from the group consisting of hydroxides of aluminum, oxides of aluminum, hydroxides of silicon and oxides of silicon (hereinafter referred to merely as "under-coating material"). The white inorganic particles coated with the under-coating material can be more effectively reduced in amount of organic pigments desorbed from the surface thereof and can show a higher light resistance, as compared to those uncoated with the under-coating material.

The amount of the under-coating material is preferably 0.01 to 20% by weight (calculated as Al, SiO$_2$ or a sum of Al and SiO$_2$) based on the weight of the white inorganic particles coated with the under-coating layer.

When the amount of the under-coating material is less than 0.01% by weight, it may be difficult to attain sufficient effects of reducing the amount of organic pigments desorbed and improving the light resistance. As long as the amount of the under-coating material falls within the range of 0.01 to 20% by weight, the effects of reducing the amount of organic pigments desorbed and improving the light resistance can be sufficiently attained. Therefore, it is unnecessary to apply the under-coating material in an amount of more than 20% by weight.

The colorant for color filter produced by using the core particles coated with the under-coating material used in the present invention are substantially the same in particle size, geometrical standard deviation value of particle diameters, BET specific surface area value, hue (L* value, a* value and b* value), tinting strength and hiding power as those of the colorant using the core particles uncoated with the under-coating material used in the present invention. The degree of desorption of the organic pigments from the colorant can be improved by coating the under-coating material on the core particles such that the colorant can show an organic pigment desorption degree of preferably the rank 5. In addition, the light resistance of the colorant can be improved by coating with the under-coating material the core particles such that the ΔE* value is preferably not more than 4.0, more preferably not more than 3.0.

Next, the coloring composition for color filter containing the colorant according to the present invention is described.

The coloring composition for color filter according to the present invention comprises the colorant for color filter, a dispersant, a binder resin, a monomer as a reactive diluent, a polymerization initiator and a solvent.

The amount of the colorant blended in the coloring composition for color filter is usually 5 to 400 parts by weight based on 100 parts by weight of the total amount of the binder resin and the monomer. In the consideration of good spectral properties of the obtained color filter, the amount of the colorant blended in the coloring composition for color filter is preferably 6 to 250 parts by weight, more preferably 7 to 150 parts by weight based on 100 parts by weight of the total amount of the binder resin and the monomer.

As the dispersants, there may be used at least one surfactant selected from the group consisting of anionic surfactants such as ammonium laurylsulfate and polyoxyethylene alkyl ether sulfuric acid triethanolamine; cationic surfactants such as stearylamine acetate and lauryltrimethylammonium chloride; amphoteric surfactants such as lauryldimethylamine oxide and laurylcarboxymethylhydroxyethyl imidazolium betaine; nonionic surfactants such as polyoxyethylene lauryl ether, polyoxyethylene stearyl ether and sorbitan monostearate. The amount of the dispersant contained in the coloring composition is preferably 0.01 to 50 parts by weight based on 100 parts by weight of the colorant contained in the coloring composition.

The binder resins used in the coloring composition is not particularly restricted as long as these binder resins show a transparency in a whole wavelength region of visible light. As such binder resins, there may be exemplified resins ordinarily used for coloring compositions for color filters, such as thermosetting resins, thermoplastic resins, or the like.

Specifically, examples of the thermosetting resins and thermoplastic resins may include butyral resins, styrene-maleic acid copolymer resins, chlorinated polyethylene, polyvinyl chloride, vinyl chloride-vinyl acetate copolymer resins, polyvinyl acetate, polyvinyl alcohol, polyurethane-based resins, phenol resins, polyester resins, acrylic resins, alkyd resins, styrene resins, polyamide resins, rubber-based resins, epoxy resins, cellulose-based resins, polybutadiene, polyimide resins, benzoguanamine resins, melamine resins, urea resins or the like.

As the monomers as a reactive diluent, there may be used monomers and/or oligomers capable of forming a coating layer when polymerized. The amount of the monomer as a reactive diluent blended in the coloring composition is preferably 5 to 500 parts by weight, more preferably 20 to 300 parts by weight based on 100 parts by weight of the binder resin.

Examples of the monomers and oligomers may include acrylic acid, methacrylic acid, 2-hydroxyethyl acrylate, 2-hydroxypropyl methacrylate, vinyl acetate, N-hydroxymethyl acrylamide, N-(1,1-dimethyl-3-oxobutyl)acrylamide, polyethylene glycol diacrylate, polyethylene glycol dimethacrylate, methylene-bisacrylamide, 1,3,5-triacryloyl-1,3,5-triazacyclohexane, pentaerythritol triacrylate, styrene, vinyl acetate, acrylic acid esters, methacrylic acid esters, acrylonitrile or the like.

Examples of the polymerization initiator used in the coloring composition may include halomethyloxadiazoles such as 2-trichloromethyl-5-styryl-1,3,4-oxadiazole; triazine-based compounds such as 2,4,6-tri(trichloromethyl)triazine; photolysis-type polymerization initiators such as azobisisobutylonitrile, benzidine alkyl ether, thioacridone, benzil and N-(alkylsulfonyloxy)-1,8-naphthalenedicarboxyimide; hydrogen-transfer-type polymerization initiators such as benzophenone, anthraquinone and 9-phenylacridine; and electron-transfer-type composite-based polymerization initiators such as benzanthrone/triethanolamine, methylene blue/benzenesulfinic acid salt, triallylimidazolyl dimer/Michiler's ketone and carbon tetrachloride/manganese carbonyl. The amount of the polymerization initiator used in the coloring composition is preferably 0.01 to 200 parts by weight based on 100 parts by weight of the monomer as a reactive diluent.

Examples of the solvent used in the coloring composition may include alicyclic hydrocarbon-based solvents such as cyclohexanone; glycol ether-based solvents such as diethylene glycol dimethyl ether, ethylene glycol diethyl ether and propylene glycol monomethyl ether; ester-based solvents such as ethyl acetate, butyl acetate and amyl acetate; alcohol-based solvents such as methanol, ethanol, isopropyl alcohol and butanol; cellosolve-based solvents such as methyl cellosolve and ethyl cellosolve; ketone-based solvents such as isobutyl ketone, methyl ethyl ketone and acetone; aromatic hydrocarbon-based solvents such as toluene, xylene and ethyl benzene; petroleum-based solvents such as mineral sprits; cellosolve acetate; or the like. These solvents may be used alone or in the form of a mixture of any two or more thereof. The amount of the solvent contained in the coloring composition is preferably 50 to 95% by weight based on the weight of the coloring composition for color filter.

When the coloring composition for color filter according to the present invention is applied onto a clear base film and then dried to form a colored film comprising the colorant, the dispersant and the binder resin, the thus obtained colored film exhibits a gloss of usually not less than 70%; a maximum light transmittance in each color transmission region of usually not less than 70%; and a light resistance ($\Delta E^*$ value) of usually not more than 5.0.

When the coloring composition for color filter according to the present invention is applied onto a clear base film and then dried to form a red-colored film, the thus obtained red-colored film exhibits a gloss of usually not less than 70%, preferably not less than 80%; a light transmittance at 620 nm of usually not less than 70%, preferably not less than 75%, more preferably not less than 80%; a light transmittance at 480 nm of usually not more than 5%, preferably not more than 3%; and a light resistance ($\Delta E^*$ value) of preferably not more than 5.0, more preferably not more than 4.0.

When the coloring composition for color filter according to the present invention is applied onto a clear base film and then dried to form a green-colored film, the thus obtained green-colored film exhibits a gloss of usually not less than 70%, preferably not less than 80%; a light transmittance at 530 nm of usually not less than 70%, preferably not less than 75%, more preferably not less than 80%; a light transmittance at 650 nm of usually not more than 5%, preferably not more than 3%; and a light resistance ($\Delta E^*$ value) of preferably not more than 5.0, more preferably not more than 4.0.

When the coloring composition for color filter according to the present invention is applied onto a clear base film and then dried to form a blue-colored film, the thus obtained blue-colored film exhibits a gloss of usually not less than 70%, preferably not less than 80%; a light transmittance at 460 nm of usually not less than 70%, preferably not less than 75%, more preferably not less than 80%; a light transmittance at 630 nm of usually not more than 5%, preferably not more than 3%; and a light resistance ($\Delta E^*$ value) of preferably not more than 5.0, more preferably not more than 4.0.

Next, the color filter produced using the coloring composition for color filter according to the present invention is described.

The color filter of the present invention comprises a substrate, a black matrix and a coloring portions composed of R (red), G (green) and B (blue), or M (magenta), Y (yellow) and C (cyan) for color display, which are formed on the substrate, and a transparent conductive film (ITO) formed on the black matrix and the coloring portions for operating a liquid crystal. Meanwhile, if required, a transparent protective film may be disposed between the black matrix plus the coloring portions and the transparent conductive film (ITO). Also, in the case of display devices of such a type in which the liquid crystal is driven by a transverse magnetic field, the ITO transparent conductive film may be omitted.

The color filter according to the present invention has a maximum light transmittance at each color transmission region of usually not less than 70%, preferably not less than 75%, more preferably not less than 80%.

Next, the process for producing the colorant for color filter used in the present invention is described.

The colorant for color filter used in the present invention is produced by mixing white inorganic particles with a gluing agent to form a gluing agent coating layer on the surface of the respective white inorganic particles; and then mixing the gluing agent-coated white inorganic particles with organic pigments.

The formation of the gluing agent coating layer on the surface of the respective white inorganic particles as the core particles may be conducted by mechanically mixing and stirring the white inorganic particles as the core particles with the gluing agent, or by mechanically mixing and stirring the white inorganic particles as the core particles and the gluing agent while spraying the gluing agent onto the white inorganic particles as the core particles. A substantially whole amount of the gluing agent added can be used for coating the surface of the white inorganic particles as the core particles.

Meanwhile, in the case where alkoxysilanes or fluoroalkylsilanes are used as the gluing agent, a part of the alkoxysilanes or fluoroalkylsilanes may be coated in the form of organosilane compounds produced from the alkoxysilanes or fluoroalkyl organosilane compounds produced form fluoroalkylsilanes through the coating step. Even in such a case, subsequent coat of the organic pigment on the gluing agent-coating layer is not adversely affected.

In order to uniformly coat the gluing agent over the surface of the white inorganic particles as the core particles, it is preferred that the agglomerated white inorganic particles are previously deaggregated using a crusher.

The mixing and stirring of the white inorganic particles as the core particles with the gluing agent, the mixing and stirring of the organic pigment with the gluing agent-coated white inorganic particles, is preferably carried out using an apparatus capable of applying a shear force to the powder mixture, especially such an apparatus capable of simultaneously effecting shear action, spatula stroking and compression. Examples of such apparatuses may include wheel-type kneaders, ball-type kneaders, blade-type kneaders, roll-type kneaders or the like. Among these apparatuses, the wheel-type kneaders are preferred to effectively practice the present invention.

Specific examples of the wheel-type kneaders may include edge runners (similar in meaning to mix muller, Simpson mill and sand mill), multimill, Stotz mill, Wet pan mill, corner mill, ring muller or the like. Among these kneaders, preferred are edge runners, multimill, Stotz mill, Wet pan mill and ring muller, and more preferred are edge runners. Specific examples of the ball-type kneaders may include vibration mill or the like. Specific examples of the blade-type kneaders may include Henschel mixer, planetary mixer, Nauter mixer or the like. Specific examples of the roll-type kneaders may include extruders or the like.

The conditions of the mixing and stirring treatment may be selected so as to uniformly coat the surface of the white inorganic particles with the gluing agent. Specifically, the mixing and stirring conditions may be appropriately controlled such that the linear load is usually 19.6 to 1,960 N/cm (2 to 200 Kg/cm), preferably 98 to 1,470 N/cm (10 to 150 Kg/cm), more preferably 147 to 980 N/cm (15 to 100 Kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The amount of the gluing agent added is preferably 0.15 to 45 parts by weight based on 100 parts by weight of the white inorganic particles as the core particles. When the gluing agent is added in an amount of 0.15 to 45 parts by weight, it is possible to adhere 1 to 500 parts by weight of the organic pigment onto 100 parts by weight of the white inorganic particles as the core particles.

After the surface of the white inorganic particles as the core particle is coated with the gluing agent, the organic pigment is added and then mixed and stirred with the coated core particles in order to adhere the organic pigment onto the gluing agent coating layer. The obtained particles may be further subjected to drying or heating treatments, if required.

As the adding method of the organic pigments, a continuous addition method and a divided addition method may be exemplified. In case of continuously adding the organic pigments, the organic pigment may be added slowly and little by little, especially for a period of usually 5 minutes to 24 hours, preferably 5 minutes to 20 hours. In case of dividedly adding the organic pigments, the adding step of the organic pigments of usually 5 to 25 parts by weight based on 100 parts by weight of the white inorganic particles as the core particles, and mixing and stirring step under the following conditions can be repeated until the added amount of the organic pigments reaches a predetermined amount thereof.

The mixing and stirring conditions may be appropriately selected so as to form a uniform organic pigment coat on the gluing agent coating layer, and may be controlled such that the linear load is usually 19.6 to 1,960 N/cm (2 to 200 Kg/cm), preferably 98 to 1,470 N/cm (10 to 150 Kg/cm), more preferably 147 to 980 N/cm (15 to 100 Kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The amount of the organic pigments added is usually 1 to 500 parts by weight, preferably 30 to 400 parts by weight, more preferably 50 to 300 parts by weight based on 100 parts by weight of the white inorganic particles as the core particles. When the amount of the organic pigments added is out of the above-specified range, it may be difficult to obtain the aimed colorant for the color filter.

The heating temperature used in the drying and heating treatments is preferably 40 to 150° C., more preferably 60 to 120° C., and the heating time is preferably 10 minutes to 12 hours, more preferably 30 minutes to 3 hours.

Meanwhile, in the case where alkoxysilanes or fluoroalkylsilanes are used as the gluing agent, a coating layer composed of organosilane compounds obtainable from the alkoxysilanes or fluorine-containing organosilane compounds obtainable from the fluoroalkylsilanes is finally formed on the surface of the white inorganic particles as the core particles when treated through these steps.

The colorant for color filter having a plurality of colored coat layers is produced by mixing white inorganic particles with a gluing agent to form a gluing agent coating layer on the surface of the respective white inorganic particles and mixing the gluing agent-coated white inorganic particles with organic pigments to form a first colored coat layer, thereby obtaining intermediate pigments; further mixing the intermediate pigments having the first colored coat layer with a gluing agent to form a gluing agent coating layer on the first colored coat layer and then mixing the gluing agent-coated intermediate pigments with organic pigments to form a second colored coat layer on the first colored coat layer. The mixing treatments with the gluing agent and with the organic pigments in the respective steps may be performed by the same method as used in each treatment mentioned above. Meanwhile, if required, the coating with the gluing agent and the coating with the organic pigments may be repeated to obtain such a colorant for color filter having three or more colored coat layers.

The white inorganic particles as the core particles may be previously coated, if required, with hydroxides and/or oxides of aluminum and/or silicon prior to mixing and stirring with the gluing agent.

The formation of the hydroxides and/or oxides of aluminum and/or silicon coat are conducted as follows. That is, an aluminum compound, a silicon compound or both the aluminum and silicon compounds are added to a water suspension prepared by dispersing the white inorganic particles in water. The resultant mixture is mixed and stirred together and then, if required, the pH value thereof is adjusted adequately, thereby forming the hydroxides and/or oxides of aluminum and/or silicon coat, on the surface of the white inorganic particle. Thereafter, the thus-obtained white inorganic particles coated with the hydroxides and/or oxides of aluminum and/or silicon are filtered out, washed with water, dried and then pulverized, and may be further subjected to subsequent treatments such as deaeration and compaction, if required.

Examples of the aluminum compound may include aluminum salts such as aluminum acetate, aluminum sulfate, aluminum chloride and aluminum nitrate, alkali aluminates such as sodium aluminate, or the like.

Examples of the silicon compound may include water glass #3, sodium orthosilicate, sodium metasilicate or the like.

Next, the process for producing the coloring composition for color filter according to the present invention is described.

The coloring composition for color filter according to the present invention is produced by first mixing and dispersing the colorant, the binder resin, the solvent and the dispersant together to obtain a kneaded material; adding to the thus obtained kneaded material, the monomer and/or oligomer as a reactive diluent, the polymerization initiator and the solvent; and then kneading the resultant mixture. The mixing and dispersing procedures may be conducted by using a ball mill, an edge runner, a twin- or triple-roll mill, an extruder, a high-speed impact mill or the like.

Next, the process for producing the color filter of the present invention is described.

In the production of the color filter, the formation of the coloring portions (dots) may be conducted by a pigment dispersion method such as an etching method and a transfer method; an ink-jet method; a printing method; an electrodeposition method; or the like. Among these methods, the pigment dispersion method and ink-jet method are preferred.

For example, in the pigment dispersion method, the application step of the coloring composition for color filter on a substrate on which a black matrix (portion) is previously formed, and then light exposure, development and baking steps are repeated to form R, G and B color patterns.

More concretely, the coloring composition for color filter is coated onto a transparent substrate on which a black matrix (portion) is previously formed, thereby producing a colored film thereon. The coating with the coloring composition may be conducted by spinner-coating, spray-coating, immersion, roll-coating, bar-coating, die-coating or the like. Then, a photoresist is applied on the colored film to form a photoresist layer for forming patterns. Then, after placing a mask on the photoresist layer, light exposure thereto is performed by irradiating the photoresist layer with ultraviolet light, visible light, electron beam, X-ray or the like using an exposure apparatus. After the exposure to light, the photoresist layer is developed with a developer and etched. After etching, the residual unnecessary photoresist layer is removed using a solvent such as acetone and cellosolve-based solvents. Thereafter, the colored portions are heat-treated to obtain patterns of the colored dots.

The above steps are repeated with respect to the respective coloring compositions of either red, green and blue, or yellow, cyan and magenta. If required, an overcoat layer composed of acrylic polymers, polysiloxanes or polyimides may be formed onto the patterns of the colored dots, and further a metal oxide film such as ITO film is deposited thereon by sputtering method, thereby obtaining a color filter.

The point of the present invention is that by using the colorant for color filter comprising the white inorganic particles, the gluing agent coating layer formed on the surface of the white inorganic particle and the organic pigment coat onto the gluing agent coating layer, and exhibiting not only a clear hue and a sharp particle size distribution but also excellent light resistance and transparency, the coloring composition for color filter according to the present invention can show not only a clear hue, an excellent light resistance and a high transparency but also an excellent dispersibility.

Thus, since the coloring composition for color filter according to the present invention exhibits a clear hue, an excellent light resistance and a high transparency, the color filter according to the present invention using such a coloring composition can also a clear hue, an excellent light resistance, a high transparency and excellent spectral properties.

In the colorant for color filter used in the present invention, the organic pigments are effectively prevented from being desorbed from the surface of the respective white inorganic particles. The reason therefor is considered to be that the finely divided organic pigments are strongly adhered onto the surface of the white inorganic particle through organosilicon compounds, coupling agents, oligomers or polymers.

The reason why the colorant for color filter used in the present invention can exhibit a sharp particle size distribution, is considered as follows. The white inorganic particles used as core particles have a sharp particle size distribution, and the organic pigments are uniformly adhered thereonto in the form of fine particles.

The reason why the colorant for color filter used in the present invention can exhibit an excellent light resistance, is considered as follows. The organic pigments having a remarkably excellent light resistance as compared to that of dyes, are adhered onto the surface of the white inorganic particle as core particles having a relatively excellent light resistance through the gluing agent having an excellent light resistance.

Also, the reason why the coloring composition for color filter according to the present invention can exhibit an excellent dispersibility, is considered as follows. By using the colorant for color filter in which the organic pigments are prevented from being desorbed from the surface of the white inorganic particle as core particles, the colorant for color filter is well dispersed in vehicle without disturbance by the desorbed organic pigments upon the production of the coloring composition.

The reason why the coloring composition for color filter according to the present invention can provide a color filter exhibiting excellent spectral properties, is considered as follows. In the case of the colorant for color filter used in the present invention, the organic pigments ordinarily working as coarse particles in vehicle because of self-agglomeration or crystal growth, are uniformly adhered onto the surface of the core particles in the form of fine particles without formation of coarse particles.

Thus, the colorant for color filter used in the present invention can exhibit not only a sharp particle size distribution and an excellent light resistance but also an excellent dispersibility. Therefore, the colorant used in the present invention is suitable as a colorant for color filter.

By using the above colorant for color filter, the coloring composition for color filter according to the present invention can exhibit an excellent dispersibility. Therefore, the coloring composition according to the present invention is suitable as a coloring composition for color filter.

The color filter according to the present invention exhibits excellent spectral properties and, therefore, is suitable as color filters for color liquid crystal display (LCD) devices.

EXAMPLES (1) The average particle size of the particles was expressed by an average value of 350 particles observed on a micrograph.

(2) The particle size distribution of the particles was expressed by the geometrical standard deviation value obtained by the following method.

That is, the particle sizes were measured from the above magnified micrograph. The actual particle sizes and the number of the particles were obtained from the calculation on the basis of the measured values. On a logarithmic normal probability paper, the particle sizes were plotted at regular intervals on the abscissa-axis and the accumulative number of particles belonging to each interval of the particle sizes were plotted by percentage on the ordinate-axis by a statistical technique. The particle sizes corresponding to the number of particles of 50% and 84.13%, respectively, were read from the graph, and the geometrical standard deviation was obtained from the following formula:

Geometrical standard deviation={particle size corresponding to 84.13% under integration sieve}/{particle size (geometrical average diameter) corresponding to 50% under integration sieve}

The more the geometrical standard deviation nears 1, the more excellent the particle size distribution of the particles.

(3) The specific surface area was expressed by the value measured by a BET method.

(4) The amounts of Al and Si which were present on the surface of the white inorganic particle coated with the under-coating material, were respectively measured by a fluorescent X-ray spectroscopy device "3063 M-type" (manufactured by RIGAKU DENKI KOGYO CO., LTD.) according to JIS K0119 "General rule of fluorescent X-ray analysis".

(5) The amount of the gluing agent coating layer formed on the surface of the white inorganic particle, and the amount of the organic pigments adhered in the colorant for color filter, were respectively determined by measuring the carbon contents using "Horiba Metal, Carbon and Sulfur Analyzer EMIA-2200 Model" (manufactured by Horiba Seisakusho Co., Ltd.).

(6) The decree of desorption of the organic pigments from the colorant for color filter was visually observed and evaluated by the following method, and the observation results were classified into the following five ranks. The rank 5 represents that the amount of the organic pigments desorbed from the surface of the colorant for color filter was smallest.

That is, 2 g of the particles to be measured and 20 ml of ethanol were placed in a 50-ml conical flask and then was subjected to ultrasonic dispersion for 60 minutes. Thereafter, the obtained dispersion was centrifuged at a rotating rate of 10,000 rpm for 15 minutes to separate the particles from the solvent. The obtained particles were dried at 80° C. for one hour, and the micrograph (×50,000) thereof was visually observed to count the number of the desorbed and re-aggregated organic pigment particles present in visual field of the micrograph. The micrograph was compared with a micrograph (×50,000) of mixed particles obtained by simply mixing the white inorganic particles with the organic pigments without adding the gluing agent. The results are classified into the following five ranks.

Rank 1: Number of desorbed and re-aggregated particles was substantially the same as that in the simply mixed particles;

Rank 2: 30 to 49 desorbed and re-aggregated particles per 100 particles of the colorant for color filter;

Rank 3: 10 to 29 desorbed and re-aggregated particles per 100 particles of the colorant for color filter;

Rank 4: 5 to 9 desorbed and re-aggregated particles per 100 particles of the colorant for color filter; and Rank 5: 0 to 4 desorbed and re-aggregated particles per 100 particles of the colorant for color filter.

(7) The hue of each of the white inorganic particles, organic pigments, and colorant for color filter, was measured by the following method.

That is, 0.5 g of each sample and 0.5 ml of castor oil were intimately kneaded together by a Hoover's muller to form a paste. 4.5 g of clear lacquer was added to the obtained paste and was intimately kneaded to form a paint. The obtained paint was applied on a clear base film by using a 150 μm (6 mil) applicator to produce a coating film piece (having a coating film thickness of about 30 μm). The thus obtained coating film piece was placed on a standard white back plate and measured by a Multi-Spectro-Colour-Meter "MSC-IS-2D" (manufactured by SUGA SHIKENKI CO., LTD.) to determine color specification values thereof according to JIS Z 8729. Meanwhile, the C* value representing chroma is calculated according to the following formula:

$$C^* = ((a^*)^2 + (b^*)^2)^{1/2}$$

(8) The tinting strength of the colorant for color filter was measured by the following method.

That is, a primary color enamel and a vehicle enamel prepared by the below-mentioned methods were respectively applied on a clear base film by using a 150 μm (6 mil) applicator to produce coating film pieces. The thus obtained coating film pieces were placed on a standard white back plate, and the L* value thereof was measured by a Multi-Spectro-Colour-Meter "MSC-IS-2D" (manufactured by SUGA SHIKENKI CO., LTD.). The difference between the obtained L* values was represented by a ΔL* value.

Next, as a standard sample for the colorant for color filter was prepared by simply mixing the organic pigments and the white inorganic particles at the same mixing ratio as used upon the production of the colorant for color filter. Using the thus prepared mixed pigment as standard sample, the same procedure as defined above was conducted to prepare an primary color enamel and a vehicle enamel, to form coating film pieces and to measure L* values thereof. The difference between the L* values was represented by a ΔLs* value.

From the obtained ΔL* value of the colorant for color filter and ΔLs* value of the standard sample, the tinting strength (%) was calculated according to the following formula:

Tinting strength (%)=100+{(ΔLs*−ΔL*)×10}

Preparation of Primary Color Enamel:

10 g of the above sample particles, 16 g of an amino alkyd resin and 6 g of a thinner were blended together. The resultant mixture was added together with 90 g of 3 mmφ glass beads into a 140-ml glass bottle, and then mixed and dispersed for 45 minutes by a paint shaker. The obtained mixture was mixed with 50 g of an amino alkyd resin, and further dispersed for 5 minutes by a paint shaker, thereby obtaining a primary color enamel.

Preparation of Vehicle Enamel:

12 g of the above-prepared primary color enamel and 40 g of Aramic White (titanium dioxide-dispersed amino alkyd resin) were blended together, and the resultant mixture was mixed and dispersed for 15 minutes by a paint shaker, thereby preparing a vehicle enamel.

(9) The hiding power of each of the white inorganic particles, organic pigments, and colorant for color filter was measured by the cryptometer method according to JIS K5101-8.2 using the above-prepared primary color enamel.

(10) The light resistance of each of the white inorganic particles, organic pigments and colorant for color filter was measured by the following method.

That is, the primary color enamel prepared above for measuring the tinting strength was applied onto a glass plate (0.8 mm×70 mm×150 mm) and dried to form a coating film having a thickness of 150 μm. One half of the thus prepared coating film piece was covered with a metal foil, and an ultraviolet light was continuously irradiated over the coating film piece at an intensity of 100 mW/cm² for 6 hours using "EYE SUPER UV TESTER SUV-W13" (manufactured by IWASAKI DENKI CO., LTD.). Then, the hues (L*, a* and b* values) of the metal foil-covered non-irradiated portion and the UV-irradiated portion of the coating film piece were respectively measured. The ΔE* value was calculated from differences between the measured hue values of the metal foil-covered non-irradiated portion and the UV-irradiated portion according to the following formula:

ΔE*=[(ΔL*)²+(Δa*)²+(Δb*)²]^{1/2} wherein ΔL* represents the difference between L* values of the non-irradiated and UV-irradiated portions; Δa* represents the difference between a* values of the non-irradiated and UV-irradiated portions; and Δb* represents the difference between b* values of the non-irradiated and UV-irradiated portions.

(11) The chromaticity of each colored film obtained by using the coloring composition for color filter, was measured according to XY chromaticity diagram prescribed by CIE (Commission Internationale de l'Eclairage) by the following method. That is, the respective coloring compositions prepared by the below-mentioned method was applied onto a clear base film to form a coating film having a thickness of 150 μm, and the coating film was dried to obtain a coating film piece. The chromaticity of the thus obtained coating film piece was measured using a portable spectrocolorimeter "COLOR-GUIDE 45/0" (manufactured by BYK CHEMIE, JAPAN CO., LTD.).

(12) The gloss of the colored film was expressed by the value obtained by measuring a gloss of the above coating film piece at an incident angle of 60° using a gloss meter "UGV-5D" (manufactured by SUGA SHIKENKI CO., LTD.). The higher the gloss, the more excellent the dispersibility of the coloring composition for color filter.

(13) The light resistance of the colored film using the coloring composition for color filter was measured by the following method.

That is, the coloring composition prepared above was applied onto a glass plate (0.8 mm×70 mm×150 mm) and dried to form a coating film having a thickness of 150 μm thereon, thereby preparing a coating film piece as a test specimen. A part of the thus prepared coating film piece was covered with a metal foil, and an ultraviolet light was continuously irradiated over the coating film piece at an intensity of 100 mW/cm² for 6 hours using "EYE SUPER UV TESTER SUV-W13" (manufactured by IWASAKI DENKI CO., LTD.). Then, the hues (L*, a* and b* values) of the metal foil-covered non-irradiated portion and the UV-irradiated portion of the coating film piece were respectively measured by a Multi-Spectro-Colour-Meter "MSC-IS-2D" (manufactured by SUGA SHIKENKI CO., LTD.). The ΔE* value was calculated from differences between the measured values of the metal foil-covered non-irradiated portion and the UV-irradiated portion according to the formula mentioned in the above (10).

(14) The light transmittance of the colored film produced by using the coloring composition for color filter was determined using the coating film piece prepared above for measuring the chromaticity of the colored film by the following method. That is, the light transmittances at wavelengths of 620 nm and 480 nm in the case of the red-based colored film, the light transmittances at wavelengths of 530 nm and 650 nm in the case of the green-based colored film, and the light transmittances at wavelengths of 460 nm and 630 nm in the case of the blue-based colored film, were respectively measured using a self-recording photoelectric spectrophotometer "UV-2100" (manufactured by SHIMADZU SEISAKUSHO CO., LTD.).

(15) The light transmittance of the color filter was determined by using a color filter prepared by the below-mentioned method. Specifically, the light transmittances at wavelengths of 620 nm, 530 nm and 460 nm, were measured using a self-recording photoelectric spectrophotometer "UV-2100" (manufactured by SHIMADZU SEISAKUSHO CO., LTD.).

Example 1

(I) <Production of Colorant G for Color Filter>

560 g of methyl hydrogen polysiloxane (tradename: "TSF484", produced by GE TOSHIBA SILICONE CO., LTD.) was added to 7.0 kg of silica particles as shown in the micrograph (×50,000) of FIG. 1 (particle shape: spherical shape; average particle diameter: 0.022 μm; BET specific surface area value: 193.8 m²/g; geometrical standard deviation value: 1.22; refractive index: 1.42; L* value: 92.4; a* value: 0.2; b* value: 0.4; C* value: 0.4; hiding power: 10 cm²/g; light resistance: 8.14) while operating an edge runner, and the resultant mixture was mixed and stirred for 30 minutes under a linear load of 588 N/cm (60 Kg/cm) at a stirring speed of 22 rpm.

Figure 2:
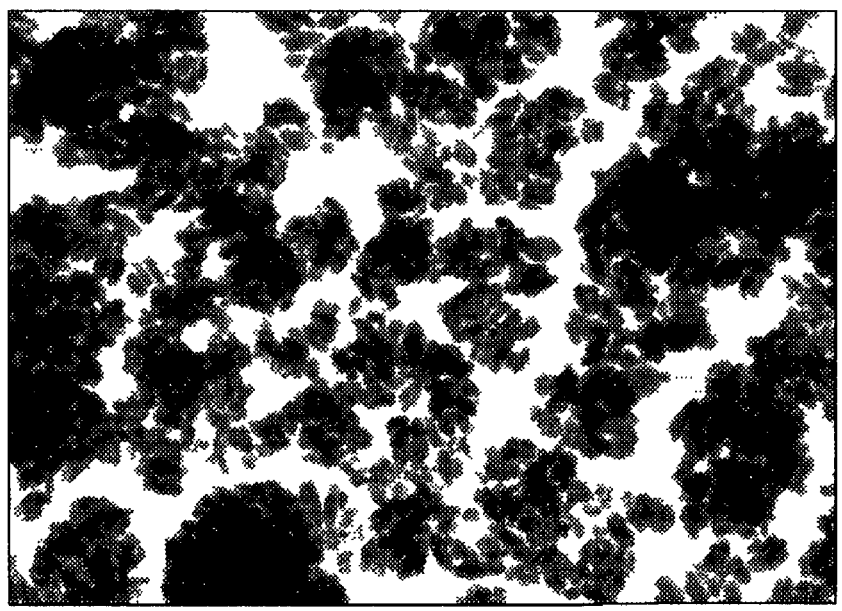
FIG. 2 is a micrograph (×50,000) of organic pigments G-1 used in Example 1.

Then, 7.0 kg of organic pigments G-1 as shown in the micrograph (×50,000) of FIG. 2 (kind: phthalocyanine-based pigments; particle shape: granular shape; average particle diameter: 0.06 μm; BET specific surface area value: 60.5 m²/g; L* value: 21.83; a* value: −18.31; b* value:

−7.36; hiding power: 210 cm$^2$/g; light resistance (ΔE* value): 9.63) were added to the above-obtained mixture for 30 minutes while operating the edge runner, and the resultant mixture was mixed and stirred for 120 minutes under a linear load of 588 N/cm (60 Kg/cm) at a stirring speed of 22 rpm, thereby forming the organic pigment G-1 coat onto the methyl hydrogen polysiloxane coating layer formed on the respective silica particles. The obtained particles were dried at 80° C. for 60 minutes using a dryer, thereby obtaining a colorant G for color filter.

The thus obtained colorant G for color filter was in the form of spherical particles having an average particle diameter of 0.026 μm, and had a BET specific surface area value of 124.6 m$^2$/g and a geometrical standard deviation value of particle diameters of 1.23. As to the hue of the colorant, the L* value thereof was 24.16; the a* value thereof was −17.84; the b* value thereof was −8.69. In addition, it was confirmed that the colorant had a tinting strength of 155%; a hiding power of 460 cm$^2$/g; a light resistance (ΔE* value) of 1.58; and an organic pigment desorption degree of Rank 5; and a coating amount of methyl hydrogen polysiloxane of 2.17% by weight (calculated as C), and that the amount of the organic pigments G-1 coat was 17.99% by weight (calculated as C; corresponding to 100 parts by weight based on 100 parts by weight of the silica particles).

Figure 3:
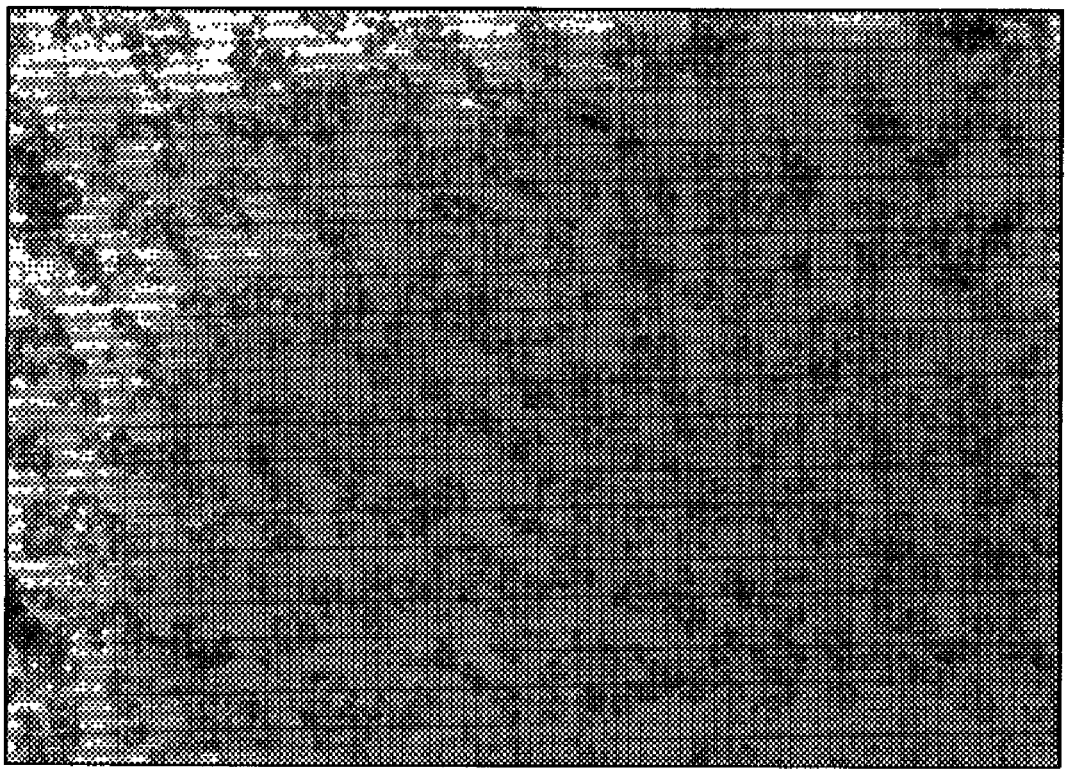
FIG. 3 is a micrograph (×50,000) of a colorant for color filter obtained in Example 1.

As a result of observing the micrograph (×50,000) of the obtained colorant G for color filter as shown in FIG. 3, since almost no organic pigments G-1 were recognized from the micrograph, it was confirmed that a substantially whole amount of the organic pigments G-1 added contributed to the formation of the organic pigment coat on the coating layer composed of methyl hydrogen polysiloxane. Further, it was confirmed that the organic pigments G-1 coat no longer maintained the particle shape and size of those initially added, more specifically it was recognized that the organic pigments G-1 had a much finer particle size than that of the core particles, and were adhered on the core particles in the form of a uniform coat.

<Production of Coloring Composition G for Color Filter>

The above-prepared colorant G for color filter, methyl methacrylate/methacrylic acid copolymer and cyclohexanone were mixed with each other at the following mixing ratio and kneaded together using a triple-roll mill.

| | |
|---|---|
| Colorant G for color filter | 10.0 parts by weight |
| Methyl methacrylate/methacrylic acid copolymer | 10.0 parts by weight |
| Cationic polymer dispersant ("SOLSPERSE 24000") | 2.5 parts by weight |
| Cyclohexanone | 12.5 parts by weight |

The obtained kneaded material was mixed with 16.5 parts by weight of propylene glycol monomethyl ether acetate, and then dispersed by a sand grinder. The resultant dispersion was filtered through a 1-μm glass filter to obtain solids.

Next, dipentaerythritol pentaacrylate, 2,4,6-tri(trichloromethyl)triazine and propylene glycol monomethyl ether acetate were added to the obtained solids at the following ratio, thereby obtaining a coloring composition for color filter.

| | |
|---|---|
| Dipentaerythritol pentaacrylate | 10.0 parts by weight |
| 2,4,6-tri(trichloromethyl) triazine | 1.0 part by weight |

-continued

| | |
|---|---|
| Propylene glycol monomethyl ether acetate | 37.5 parts by weight |

The thus obtained coloring composition G for color filter was applied onto a clear base film to form a coating film having a thickness of 150 μm (6 mil) thereon, and then dried, thereby obtaining a green colored film. The obtained green colored film had a gloss of 94%. As to the chromaticity of the green colored film, the x value thereof was 0.24; the y value thereof was 0.65; and the Y value thereof was 36.97. Further, it was confirmed that the green colored film exhibited a light resistance (ΔE* value) of 1.58; a light transmittance at 530 nm of 88%; and a light transmittance at 650 nm of less than 1%.

(II) <Production of Colorant R for Color Filter>

560 g of methyl hydrogen polysiloxane (tradename: "TSF484", produced by GE TOSHIBA SILICONE CO., LTD.) was added to 7.0 kg of silica particles as shown in the micrograph (×50,000) of FIG. 1 (particle shape: spherical shape; average particle diameter: 0.022 μm; BET specific surface area value: 193.8 m$^2$/g; geometrical standard deviation value: 1.22; refractive index: 1.42; L* value: 92.4; a* value: 0.2; b* value: 0.4; C* value: 0.4; hiding power: 10 cm$^2$/g; light resistance: 8.14) while operating an edge runner, and the resultant mixture was mixed and stirred for 30 minutes under a linear load of 588 N/cm (60 Kg/cm) at a stirring speed of 22 rpm.

Then, 7.0 kg of organic pigments R-1 (kind: anthraquinone-based pigments; particle shape: granular shape; average particle diameter: 0.09 μm; BET specific surface area value: 53.2 m$^2$/g; L* value: 31.61; a* value: 63.66; b* value: 12.61; hiding power: 360 cm$^2$/g; light resistance (ΔE* value): 11.23) were added to the above-obtained mixture for 30 minutes while operating the edge runner, and the resultant mixture was mixed and stirred for 120 minutes under a linear load of 588 N/cm (60 Kg/cm) at a stirring speed of 22 rpm, thereby forming the organic pigment R-1 coat onto the methyl hydrogen polysiloxane coating layer formed on the respective silica particles. The obtained particles were dried at 80° C. for 60 minutes using a dryer, thereby obtaining a colorant R for color filter.

The thus obtained colorant R for color filter was in the form of spherical particles having an average particle diameter of 0.026 μm, and had a BET specific surface area value of 119.4 m$^2$/g and a geometrical standard deviation value of particle diameters of 1.23. As to the hue of the colorant, the L* value thereof was 33.22; the a* value thereof was 62.75; the b* value thereof was 10.83. In addition, it was confirmed that the colorant had a tinting strength of 151%; a hiding power of 480 cm$^2$/g; a light resistance (ΔE* value) of 1.94; and an organic pigment desorption degree of Rank 5; and a coating amount of methyl hydrogen polysiloxane of 2.16% by weight (calculated as C), and that the amount of the organic pigments R-1 coat was 37.41% by weight (calculated as C; corresponding to 100 parts by weight based on 100 parts by weight of the silica particles).

As a result of observing the micrograph of the obtained colorant R for color filter, since almost no organic pigments R-1 were recognized from the micrograph, it was confirmed that a substantially whole amount of the organic pigments R-1 added contributed to the formation of the organic pigment coat on the coating layer composed of methyl hydrogen polysiloxane. Further, it was confirmed that the organic pigments R-1 coat no longer maintained the particle shape and size of those initially added, more specifically it was recognized that the organic pigments G-1 had a much finer particle size than that of the core particles, and were adhered on the core particles in the form of a uniform coat.

<Production of Coloring Composition R for Color Filter>

The above-prepared colorant R for color filter, methyl methacrylate/methacrylic acid copolymer and cyclohexanone were mixed with each other at the following mixing ratio and kneaded together using a triple-roll mill.

| Colorant R for color filter | 10.0 parts by weight |
|---|---|
| Methyl methacrylate/methacrylic acid copolymer | 10.0 parts by weight |
| Cationic polymer dispersant ("SOLSPERSE 24000") | 2.5 parts by weight |
| Cyclohexanone | 12.5 parts by weight |

The obtained kneaded material was mixed with 16.5 parts by weight of propylene glycol monomethyl ether acetate, and then dispersed by a sand grinder. The resultant dispersion was filtered through a 1-μm glass filter to obtain solids.

Next, dipentaerythritol pentaacrylate, 2,4,6-tri(trichloromethyl)triazine and propylene glycol monomethyl ether acetate were added to the obtained solids at the following ratio, thereby obtaining a coloring composition R for color filter.

| Dipentaerythritol pentaacrylate | 10.0 parts by weight |
|---|---|
| 2,4,6-tri(trichloromethyl) triazine | 1.0 part by weight |
| Propylene glycol monomethyl ether acetate | 37.5 parts by weight |

The thus obtained coloring composition R for color filter was applied onto a clear base film to form a coating film having a thickness of 150 μm (6 mil) thereon, and then dried, thereby obtaining a red colored film. The obtained red colored film had a gloss of 93%. As to the chromaticity of the red colored film, the x value thereof was 0.41; the y value thereof was 0.18; and the Y value thereof was 10.89. Further, it was confirmed that the red colored film exhibited a light resistance ($\Delta E^*$ value) of 2.03; a light transmittance at 620 nm of 83%; and a light transmittance at 480 nm of less than 1%.

(III) <Production of Colorant B for Color Filter>

560 g of methyl hydrogen polysiloxane (tradename: "TSF484", produced by GE TOSHIBA SILICONE CO., LTD.) was added to 7.0 kg of silica particles as shown in the micrograph (×50,000) of FIG. 1 (particle shape: spherical shape; average particle diameter: 0.022 μm; BET specific surface area value: 193.8 m$^2$/g; geometrical standard deviation value: 1.22; refractive index: 1.42; L* value: 92.4; a* value: 0.2; b* value: 0.4; C* value: 0.4; hiding power: 10 cm$^2$/g; light resistance: 8.14) while operating an edge runner, and the resultant mixture was mixed and stirred for 30 minutes under a linear load of 588 N/cm (60 Kg/cm) at a stirring speed of 22 rpm.

Then, 7.0 kg of organic pigments B-1 (kind: phthalocyanine-based pigments; particle shape: granular shape; average particle diameter: 0.06 μm; BET specific surface area value: 71.6 m$^2$/g; L* value: 17.70; a* value: 9.72; b* value: −23.44; hiding power: 240 cm$^2$/g; light resistance ($\Delta E^*$ value): 10.84) were added to the above-obtained mixture for 30 minutes while operating the edge runner, and the resultant mixture was mixed and stirred for 120 minutes under a linear load of 588 N/cm (60 Kg/cm) at a stirring speed of 22 rpm, thereby forming the organic pigment B-1 coat onto the methyl hydrogen polysiloxane coating layer formed on the respective silica particles. The obtained particles were dried at 80° C. for 60 minutes using a dryer, thereby obtaining a colorant B for color filter.

The thus obtained colorant B for color filter was in the form of spherical particles having an average particle diameter of 0.026 μm, and had a BET specific surface area value of 128.3 m$^2$/g and a geometrical standard deviation value of particle diameters of 1.23. As to the hue of the colorant, the L* value thereof was 18.15; the a* value thereof was 9.08; the b* value thereof was −21.64. In addition, it was confirmed that the colorant had a tinting strength of 150%; a hiding power of 460 cm$^2$/g; a light resistance ($\Delta E^*$ value) of 1.48; and an organic pigment desorption degree of Rank 5; and a coating amount of methyl hydrogen polysiloxane of 2.17% by weight (calculated as C), and that the amount of the organic pigments B-1 coat was 33.27% by weight (calculated as C; corresponding to 100 parts by weight based on 100 parts by weight of the silica particles).

As a result of observing the micrograph of the obtained colorant B for color filter, since almost no organic pigments B-1 were recognized from the micrograph, it was confirmed that a substantially whole amount of the organic pigments B-1 added contributed to the formation of the organic pigment coat on the coating layer composed of methyl hydrogen polysiloxane. Further, it was confirmed that the organic pigments B-1 coat no longer maintained the particle shape and size of those initially added, more specifically it was recognized that the organic pigments B-1 had a much finer particle size than that of the core particles, and were adhered on the core particles in the form of a uniform coat.

<Production of Coloring Composition B for Color Filter>

The above-prepared colorant B for color filter, methyl methacrylate/methacrylic acid copolymer and cyclohexanone were mixed with each other at the following mixing ratio and kneaded together using a triple-roll mill.

| Colorant B for color filter | 10.0 parts by weight |
|---|---|
| Methyl methacrylate/methacrylic acid copolymer | 10.0 parts by weight |
| Cationic polymer dispersant ("SOLSPERSE 24000") | 2.5 parts by weight |
| Cyclohexanone | 12.5 parts by weight |

The obtained kneaded material was mixed with 16.5 parts by weight of propylene glycol monomethyl ether acetate, and then dispersed by a sand grinder. The resultant dispersion was filtered through a 1-μm glass filter to obtain solids.

Next, dipentaerythritol pentaacrylate, 2,4,6-tri(trichloromethyl)triazine and propylene glycol monomethyl ether acetate were added to the obtained solids at the following ratio, thereby obtaining a coloring composition B for color filter.

| Dipentaerythritol pentaacrylate | 10.0 parts by weight |
|---|---|
| 2,4,6-tri(trichloromethyl) triazine | 1.0 part by weight |

-continued

| Propylene glycol monomethyl ether acetate | 37.5 parts by weight |

The thus obtained coloring composition B for color filter was applied onto a clear base film to form a coating film having a thickness of 150 µm (6 mil) thereon, and then dried, thereby obtaining a blue colored film. The obtained blue colored film had a gloss of 94%. As to the chromaticity of the blue colored film, the x value thereof was 0.14; the y value thereof was 0.13; and the Y value thereof was 7.55. Further, it was confirmed that the blue colored film exhibited a light resistance ($\Delta E^*$ value) of 1.45; a light transmittance at 460 nm of 85%; and a light transmittance at 630 nm of less than 1%.

Example 2

<Production of Color Filter>

The coloring composition G obtained in Example 1 was spin-coated onto a 0.7 mm-thick non-alkali glass plate on which black matrix patterns having a thickness of 1.0 µm were previously formed, and then heat-dried at 90° C. for 10 minutes using a dryer, thereby a green colored film having a thickness of 1.5 µm. A positive-type photoresist was applied onto the thus obtained colored film, and then heat-dried at 80° C. for 20 minutes to form a photoresist layer having a thickness of 1.1 µm thereon. The thus obtained photoresist layer was exposed to light emitted from a 250 W extra-high-pressure mercury lamp at a light quantity of 400 mJ/cm$^2$, immersed in a developing solution to develop patterns as formed, and then etched with methyl cellosolve acetate to peel off unnecessary portions of the photoresist layer therefrom. The thus obtained colored film was heat-treated in a nitrogen atmosphere at 250° C. for 30 minutes, thereby forming 1.2 µm-thick patterns of the green colored film.

Subsequently, the coloring composition R and coloring composition B obtained in Example 1 were respectively treated by the same method as defined above, thereby forming respective 1.2 µm-thick patterns of the red and blue colored films.

Then, 65.05 g of trimellitic acid was dissolved in 280 g of γ-butyl lactone, and then mixed with 74.95 g of γ-aminopropyl triethoxysilane. The resultant mixture was heated at 120° C. for 2 hours. 7 g of bisphenoxyethanol fluorene diglycidyl ether and 15 g of diethylene glycol dimethyl ether were added 20 g of the obtained solution, and the resultant mixture was stirred at room temperature (about 23° C.) for 2 hours. The thus obtained resin solution composition was spin-coated onto the above patterns of colored film, and then heated at 100° C. for 5 minutes and at 260° C. for 30 minutes, thereby forming an overcoat layer having a thickness of 1.0 µm thereon. Next, the obtained film was subjected to sputtering to form an ITO film on the overcoat layer, thereby obtaining a color filter.

It was confirmed that the respective light transmittances of the thus obtained color filter at 620 nm, 530 nm and 460 nm were 85%, 89% and 85%, respectively.

Core Particles 1 to 3:

White inorganic particles having properties shown in Table 1 were prepared as core particles 1 to 3.

Core Particles 4:

A slurry containing silica particles was obtained by dispersing 20 kg of silica particles (core particles 1) in 150 liters of water. The pH value of the thus obtained re-dispersed slurry containing the silica particles was adjusted to 10.5 using an aqueous sodium hydroxide solution, and then the slurry concentration was adjusted to 98 g/liter by adding water thereto. After 150 liters of the slurry was heated to 60° C., 2,722 ml of a 1.0 mol/liter sodium aluminate solution (corresponding to 0.5% by weight (calculated as Al) based on the weight of the silica particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the silica particles whose surface was coated with hydroxides of aluminum.

The essential production conditions are shown in Table 2, and various properties of the obtained surface-treated silica particles are shown in Table 3.

Core Particles 5 and 6:

The same procedure as defined for the production of the above core particles 4, was conducted except that the core particles 2 and 3 were used as the white inorganic particles instead of the core particles 1, and kinds and amounts of surface-coating materials were changed variously, thereby obtaining white inorganic particles whose surface was coated with the surface-coating materials.

The essential production conditions are shown in Table 2, and various properties of the obtained surface-treated white inorganic particles are shown in Table 3.

Meanwhile, in Tables, "A" and "S" as described in "kind of coating material used in surface-treating step" represent hydroxides of aluminum and oxides of silicon, respectively.

Organic Pigments:

Organic pigments having properties as shown in Table 4 were prepared.

Examples 3 to 21 and Comparative Examples 1 to 5

The same procedure as defined in Example 1 was conducted except that kinds and amounts of additives added in coating step with gluing agent, linear load and treating time for edge runner treatment used in the coating step with gluing agent, kinds and amounts of organic pigments coat in organic pigment-coat formation step, and linear load and treating time for edge runner treatment used in the organic pigment-coat formation step, were changed variously, thereby obtaining colorants for color filter.

The essential production conditions are shown in Tables 5 and 6, and various properties of the obtained colorants for color filter are shown in Tables 7 and 8.

Meanwhile, in Examples 3 to 7, 20 and 21, the respective organic pigments were added five times in an amount of 20.0 g each to 100.0 g of the core particles such that the total amount of the respective organic pigments added was 100.0 g. In Examples 14 to 16, 100.0 g of the respective organic pigments were continuously added to 100.0 g of the core particles for 100 minutes. In Examples 8 to 10, after the respective organic pigments were previously mixed together using a Henschel mixer, etc., 100.0 g of the thus obtained mixed pigments were continuously added to 100.0 g of the core particles for 100 minutes. In Examples 11 to 13, the respective organic pigments were added ten times in an amount of 15.0 g each to 100.0 g of the core particles such that the total amount of the respective organic pigments added was 150.0 g. In Examples 17 to 19, 200.0 g of the respective organic pigments were continuously added to 100.0 g of the core particles for 200 minutes.

Examples 22 to 40 and Comparative Examples 6 to 15

<Resin Composition for Color Filter>

The same procedure as defined in Example 1 was conducted except that kinds of colorants for color filter were changed variously, thereby obtaining coloring compositions for color filter.

The essential production conditions and various properties of the obtained colored films are shown in Tables 9 and 10.

Examples 41 to 46 and Comparative Examples 16 to 18

<Color Filter>

The same procedure as defined in Example 2 was conducted except that kinds of coloring compositions for color filter were changed variously, thereby obtaining color filters.

The essential production conditions and various properties of the obtained color filters are shown in Table 11.

TABLE 1

| | Properties of white inorganic particles | | |
|---|---|---|---|
| Kind of core particles | Kind | Shape | Average particle diameter (μm) |
| Core particles 1 | Silica | Spherical | 0.021 |
| Core particles 2 | Silica | Spherical | 0.005 |
| Core particles 3 | Precipitated barium sulfate | Granular | 0.059 |

| | Properties of white inorganic particles | | |
|---|---|---|---|
| Kind of core particles | BET specific surface area value (m²/g) | Geometrical standard deviation value (−) | Refractive index (−) |
| Core particles 1 | 196.2 | 1.21 | 1.42 |
| Core particles 2 | 312.6 | 1.28 | 1.42 |
| Core particles 3 | 21.3 | 1.42 | 1.62 |

| | Properties of white inorganic particles | | | |
|---|---|---|---|---|
| | | Hue | | |
| Kind of core particles | L* value (−) | a* value (−) | b* value (−) | C* value (−) |
| Core particles 1 | 93.12 | 0.11 | 0.26 | 0.28 |
| Core particles 2 | 92.16 | 0.12 | 1.31 | 1.32 |
| Core particles 3 | 91.62 | 0.31 | 1.03 | 1.08 |

TABLE 1-continued

| | Properties of white inorganic particles | |
|---|---|---|
| Kind of core particles | Hiding power (cm²/g) | Light resistance (ΔE* value) (−) |
| Core particles 1 | 6 | 5.21 |
| Core particles 2 | 6 | 5.46 |
| Core particles 3 | 13 | 5.92 |

TABLE 2

| | | Surface-treating step Additives | | |
|---|---|---|---|---|
| Core particles | Kind of core particles | Kind | Calculated as | Amount (wt. %) |
| Core particles 4 | Core particles 1 | Sodium aluminate | Al | 0.5 |
| Core particles 5 | Core particles 2 | Aluminum sulfate | Al | 2.0 |
| Core particles 6 | Core particles 3 | Sodium aluminate | Al | 2.0 |
| | | Water glass #3 | SiO₂ | 0.5 |

| | Surface-treating step Coating material | | |
|---|---|---|---|
| Core particles | Kind | Calculated as | Amount (wt. %) |
| Core particles 4 | A | Al | 0.49 |
| Core particles 5 | A | Al | 1.96 |
| Core particles 6 | A | Al | 1.93 |
| | S | SiO₂ | 0.47 |

TABLE 3

| | Properties of surface-treated white inorganic particles | | |
|---|---|---|---|
| Kind of core particles | Average particle diameter (μm) | BET specific surface area value (m²/g) | Geometrical standard deviation value (−) |
| Core particles 4 | 0.022 | 186.3 | 1.21 |
| Core particles 5 | 0.005 | 296.4 | 1.28 |
| Core particles 6 | 0.061 | 21.9 | 1.42 |

| | Properties of surface-treated white inorganic particles | | | |
|---|---|---|---|---|
| | | Hue | | |
| Kind of core particles | L* value (−) | a* value (−) | b* value (−) | C* value (−) |
| Core particles 4 | 92.99 | 0.09 | 0.11 | 0.14 |
| Core particles 5 | 91.99 | 0.11 | 1.42 | 1.42 |
| Core particles 6 | 91.03 | 0.44 | 0.81 | 0.92 |

TABLE 3-continued

| | Properties of surface-treated white inorganic particles | |
|---|---|---|
| Kind of core particles | Hiding power (cm²/g) | Light resistance (ΔE* value) (−) |
| Core particles 4 | 6 | 5.06 |
| Core particles 5 | 6 | 5.13 |
| Core particles 6 | 14 | 5.32 |

TABLE 4

| Organic pigments | Properties of organic pigments | |
|---|---|---|
| | Kind | Shape |
| Organic pigments B-1 | Pigment Blue (phthalocyanine-based pigment) | Granular |
| Organic pigments G-1 | Pigment Green (phthalocyanine-based pigment) | Granular |
| Organic pigments R-1 | Pigment Red (anthraquinone-based pigment) | Granular |
| Organic pigments R-2 | Pigment Red (quinacridone-based pigment) | Bar-shaped |
| Organic pigments V-1 | Pigment Violet (dioxazine-based pigment) | Granular |
| Organic pigments Y-1 | Pigment Yellow (isoindoline-based pigment) | Granular |

| | Properties of organic pigments | |
|---|---|---|
| Organic pigments | Average particle diameter (μm) | BET specific surface area value (m²/g) |
| Organic pigments B-1 | 0.06 | 71.6 |
| Organic pigments G-1 | 0.06 | 60.5 |
| Organic pigments R-1 | 0.09 | 53.2 |
| Organic pigments R-2 | 0.08 | 61.3 |
| Organic pigments V-1 | 0.13 | 43.8 |
| Organic pigments Y-1 | 0.16 | 21.6 |

| | Properties of organic pigments Hue | | |
|---|---|---|---|
| Organic pigments | L* value (−) | a* value (−) | b* value (−) |
| Organic pigments B-1 | 17.70 | 9.72 | −23.44 |
| Organic pigments G-1 | 21.83 | −18.31 | −7.36 |
| Organic pigments R-1 | 31.61 | 63.66 | 12.61 |
| Organic pigments R-2 | 28.62 | 54.22 | −12.62 |
| Organic pigments V-1 | 21.32 | 31.60 | −21.10 |
| Organic pigments Y-1 | 78.21 | 9.62 | 71.62 |

| | Properties of organic pigments | |
|---|---|---|
| Organic pigments | Hiding power (cm²/g) | Light resistance (ΔE* value) (−) |
| Organic pigments B-1 | 240 | 10.84 |
| Organic pigments G-1 | 210 | 9.63 |
| Organic pigments R-1 | 360 | 11.23 |
| Organic pigments R-2 | 380 | 10.68 |
| Organic pigments V-1 | 280 | 14.32 |
| Organic pigments Y-1 | 160 | 17.14 |

TABLE 5

| Examples | Kind of core particles |
|---|---|
| Example 3 | Core particles 1 |
| Example 4 | Core particles 1 |
| Example 5 | Core particles 1 |
| Example 6 | Core particles 1 |
| Example 7 | Core particles 1 |
| Example 8 | Core particles 1 |
| Example 9 | Core particles 1 |
| Example 10 | Core particles 1 |
| Example 11 | Core particles 2 |
| Example 12 | Core particles 2 |
| Example 13 | Core particles 2 |
| Example 14 | Core particles 3 |
| Example 15 | Core particles 3 |
| Example 16 | Core particles 3 |
| Example 17 | Core particles 4 |
| Example 18 | Core particles 4 |
| Example 19 | Core particles 4 |
| Example 20 | Core particles 5 |
| Example 21 | Core particles 6 |

| | Production of colorant for color filter Coating step with gluing agent Additives | |
|---|---|---|
| Examples | Kind | Amount added (wt. part) |
| Example 3 | Methyl hydrogen polysiloxane | 5.0 |
| Example 4 | Methyl hydrogen polysiloxane | 10.0 |
| Example 5 | Methyl hydrogen polysiloxane | 3.0 |
| Example 6 | Methyl hydrogen polysiloxane | 6.0 |
| Example 7 | Methyl hydrogen polysiloxane | 7.0 |
| Example 8 | Methyl hydrogen polysiloxane | 8.0 |

TABLE 5-continued

| Examples | | | | |
|---|---|---|---|---|
| Example 9 | Methyl hydrogen polysiloxane | | | 4.0 |
| Example 10 | Methyl hydrogen polysiloxane | | | 5.0 |
| Example 11 | Methyl triethoxysilane | | | 12.0 |
| Example 12 | Methyl triethoxysilane | | | 10.0 |
| Example 13 | Methyl triethoxysilane | | | 11.0 |
| Example 14 | Methyl trimethoxysilane | | | 5.0 |
| Example 15 | Methyl trimethoxysilane | | | 8.0 |
| Example 16 | Methyl trimethoxysilane | | | 6.0 |
| Example 17 | Phenyl triethoxysilane | | | 3.0 |
| Example 18 | Phenyl triethoxysilane | | | 10.0 |
| Example 19 | Phenyl triethoxysilane | | | 20.0 |
| Example 20 | γ-aminopropyl triethoxysilane | | | 20.0 |
| Example 21 | Polyvinyl alcohol | | | 15.0 |

Production of colorant for color filter
Coating step with gluing agent

| | Edge runner treatment | | Coating amount (calculated as C) |
|---|---|---|---|
| Examples | Linear load (N/cm) | Time (Kg/cm) | (min) (wt. %) |
| Example 3 | 588 | 60 | 60 | 2.04 |
| Example 4 | 588 | 60 | 30 | 4.11 |
| Example 5 | 588 | 60 | 30 | 1.19 |
| Example 6 | 588 | 60 | 40 | 2.42 |
| Example 7 | 392 | 40 | 60 | 2.86 |
| Example 8 | 490 | 50 | 120 | 3.21 |
| Example 9 | 735 | 75 | 60 | 1.63 |
| Example 10 | 588 | 60 | 80 | 2.03 |
| Example 11 | 294 | 30 | 60 | 0.72 |
| Example 12 | 588 | 60 | 60 | 0.60 |
| Example 13 | 441 | 45 | 120 | 0.66 |
| Example 14 | 588 | 60 | 60 | 0.42 |
| Example 15 | 784 | 80 | 75 | 0.65 |
| Example 16 | 686 | 70 | 80 | 0.49 |
| Example 17 | 588 | 60 | 80 | 1.04 |
| Example 18 | 441 | 45 | 60 | 3.29 |
| Example 19 | 588 | 60 | 60 | 6.04 |
| Example 20 | 784 | 80 | 80 | 2.70 |
| Example 21 | 588 | 60 | 30 | 7.11 |

Production of colorant for color filter
Organic pigment-coat formation step

| | Organic pigments | | Organic pigments | |
|---|---|---|---|---|
| Examples | Kind | Amount added (wt. part) | Kind | Amount added (wt. part) |
| Example 3 | B-1 | 100.0 | — | — |
| Example 4 | G-1 | 100.0 | — | — |
| Example 5 | R-1 | 100.0 | — | — |
| Example 6 | R-2 | 100.0 | — | — |
| Example 7 | Y-1 | 100.0 | — | — |
| Example 8 | B-1 | 95.0 | V-1 | 5.0 |
| Example 9 | G-1 | 95.0 | Y-1 | 5.0 |
| Example 10 | R-1 | 90.0 | Y-1 | 10.0 |
| Example 11 | B-1 | 150.0 | — | — |
| Example 12 | G-1 | 150.0 | — | — |
| Example 13 | R-1 | 150.0 | — | — |
| Example 14 | B-1 | 100.0 | — | — |
| Example 15 | G-1 | 100.0 | — | — |
| Example 16 | R-1 | 100.0 | — | — |
| Example 17 | B-1 | 200.0 | — | — |
| Example 18 | G-1 | 200.0 | — | — |
| Example 19 | R-1 | 200.0 | — | — |
| Example 20 | B-1 | 100.0 | — | — |
| Example 21 | G-1 | 100.0 | — | — |

Production of colorant for color filter
Organic pigment-coat formation step

| | Edge runner treatment | | Amount of organic pigment (calculated as C) |
|---|---|---|---|
| Examples | Linear load (N/cm) | Time (Kg/cm) | (min) (wt. %) |
| Example 3 | 588 | 60 | 60 | 33.21 |
| Example 4 | 735 | 75 | 30 | 18.02 |
| Example 5 | 784 | 80 | 60 | 37.37 |
| Example 6 | 588 | 60 | 120 | 38.59 |
| Example 7 | 588 | 60 | 60 | 26.00 |
| Example 8 | 735 | 75 | 70 | 33.28 |
| Example 9 | 441 | 45 | 120 | 18.31 |
| Example 10 | 637 | 65 | 60 | 36.19 |
| Example 11 | 686 | 70 | 90 | 39.85 |
| Example 12 | 588 | 60 | 120 | 21.54 |
| Example 13 | 637 | 65 | 60 | 44.76 |
| Example 14 | 686 | 70 | 45 | 33.18 |
| Example 15 | 588 | 60 | 60 | 17.96 |
| Example 16 | 784 | 80 | 80 | 37.29 |
| Example 17 | 441 | 45 | 60 | 44.16 |
| Example 18 | 294 | 30 | 80 | 25.06 |
| Example 19 | 588 | 60 | 70 | 49.65 |
| Example 20 | 784 | 80 | 60 | 33.14 |
| Example 21 | 784 | 80 | 90 | 18.03 |

TABLE 6

Production of colorant for color filter
Coating step with gluing agent
Additives

| Comparative Examples | Kind of core particles | Kind | Amount added (wt. part) |
|---|---|---|---|
| Comparative Example 1 | Core particles 1 | — | — |
| Comparative Example 2 | Core particles 1 | — | — |
| Comparative Example 3 | Core particles 1 | — | — |
| Comparative Example 4 | Core particles 1 | Methyl hydrogen polysiloxane | 0.005 |
| Comparative Example 5 | Core particles 1 | Methyl hydrogen polysiloxane | 1.0 |

Production of colorant for color filter
Coating step with gluing agent

| | Edge runner treatment | | Coating amount (calculated as C) |
|---|---|---|---|
| Comparative Examples | Linear load (N/cm) | Time (Kg/cm) | (min) (wt. %) |
| Comparative Example 1 | — | — | — | — |
| Comparative Example 2 | — | — | — | — |
| Comparative Example 3 | — | — | — | — |
| Comparative Example 4 | 588 | 60 | 60 | $2 \times 10^{-3}$ |
| Comparative Example 5 | 588 | 60 | 60 | 0.40 |

TABLE 6-continued

Production of colorant for color filter
Organic pigment-coat formation step

| Comparative Examples | Organic pigments Kind | Organic pigments Amount added (wt. part) | Organic pigments Kind | Organic pigments Amount added (wt. part) |
|---|---|---|---|---|
| Comparative Example 1 | B-1 | 100.0 | — | — |
| Comparative Example 2 | G-1 | 100.0 | — | — |
| Comparative Example 3 | R-1 | 100.0 | — | — |
| Comparative Example 4 | B-1 | 100.0 | — | — |
| Comparative Example 5 | B-1 | 750.0 | — | — |

Production of colorant for color filter
Organic pigment-coat formation step

| Comparative Examples | Edge runner treatment Linear load (N/cm) | Edge runner treatment Linear load (Kg/cm) | Edge runner treatment Time (min) | Amount of organic pigment (calculated as C) (wt. %) |
|---|---|---|---|---|
| Comparative Example 1 | 588 | 60 | 60 | 33.16 |
| Comparative Example 2 | 588 | 60 | 60 | 18.01 |
| Comparative Example 3 | 588 | 60 | 60 | 37.30 |
| Comparative Example 4 | 588 | 60 | 60 | 33.19 |
| Comparative Example 5 | 588 | 60 | 60 | 58.42 |

TABLE 7

Properties of colorant for color filter

| Examples | Average particle diameter (μm) | BET specific surface area value (m²/g) | Geometrical standard deviation value (-) |
|---|---|---|---|
| Example 3 | 0.025 | 56.3 | 1.21 |
| Example 4 | 0.026 | 63.2 | 1.21 |
| Example 5 | 0.025 | 58.2 | 1.22 |
| Example 6 | 0.025 | 56.3 | 1.22 |
| Example 7 | 0.026 | 58.1 | 1.22 |
| Example 8 | 0.025 | 62.6 | 1.22 |
| Example 9 | 0.025 | 64.8 | 1.23 |
| Example 10 | 0.025 | 68.5 | 1.23 |
| Example 11 | 0.009 | 91.6 | 1.29 |
| Example 12 | 0.010 | 81.3 | 1.29 |
| Example 13 | 0.009 | 79.6 | 1.30 |
| Example 14 | 0.063 | 17.6 | 1.43 |
| Example 15 | 0.063 | 18.4 | 1.43 |
| Example 16 | 0.063 | 16.4 | 1.44 |
| Example 17 | 0.029 | 55.8 | 1.23 |
| Example 18 | 0.029 | 59.6 | 1.23 |
| Example 19 | 0.030 | 56.3 | 1.24 |
| Example 20 | 0.011 | 88.8 | 1.29 |
| Example 21 | 0.066 | 16.5 | 1.44 |

TABLE 7-continued

Properties of colorant for color filter
Hue

| Examples | L* value (-) | a* value (-) | b* value (-) |
|---|---|---|---|
| Example 3 | 18.36 | 9.12 | −21.32 |
| Example 4 | 23.14 | −16.56 | −6.16 |
| Example 5 | 33.32 | 60.16 | 10.56 |
| Example 6 | 31.64 | 52.28 | −10.65 |
| Example 7 | 81.64 | 8.76 | 65.36 |
| Example 8 | 23.16 | 11.32 | −22.16 |
| Example 9 | 25.36 | −17.64 | 5.32 |
| Example 10 | 35.36 | 62.16 | 14.13 |
| Example 11 | 21.10 | 8.86 | −20.64 |
| Example 12 | 22.64 | −17.14 | −6.68 |
| Example 13 | 35.14 | 61.15 | 10.68 |
| Example 14 | 20.16 | 8.73 | −21.12 |
| Example 15 | 23.23 | −17.64 | −6.61 |
| Example 16 | 33.33 | 61.32 | 11.83 |
| Example 17 | 18.12 | 9.64 | −22.88 |
| Example 18 | 22.11 | −18.12 | −7.24 |
| Example 19 | 32.63 | 61.19 | 12.28 |
| Example 20 | 18.83 | 8.64 | −20.12 |
| Example 21 | 23.26 | 17.16 | 6.83 |

Properties of colorant for color filter

| Examples | Tinting strength (%) | Hiding power (cm²/g) |
|---|---|---|
| Example 3 | 136 | 460 |
| Example 4 | 146 | 420 |
| Example 5 | 158 | 480 |
| Example 6 | 163 | 480 |
| Example 7 | 156 | 390 |
| Example 8 | 153 | 480 |
| Example 9 | 146 | 420 |
| Example 10 | 132 | 410 |
| Example 11 | 183 | 480 |
| Example 12 | 196 | 460 |
| Example 13 | 178 | 410 |
| Example 14 | 132 | 440 |
| Example 15 | 141 | 460 |
| Example 16 | 138 | 420 |
| Example 17 | 211 | 470 |
| Example 18 | 221 | 440 |
| Example 19 | 216 | 490 |
| Example 20 | 138 | 460 |
| Example 21 | 138 | 470 |

Properties of colorant for color filter

| Examples | Light resistance (ΔE* value) (-) | Degree of desorption of organic pigments (-) |
|---|---|---|
| Example 3 | 1.46 | 5 |
| Example 4 | 1.32 | 5 |
| Example 5 | 2.04 | 4 |
| Example 6 | 1.63 | 4 |
| Example 7 | 2.24 | 4 |
| Example 8 | 1.45 | 5 |
| Example 9 | 1.48 | 5 |
| Example 10 | 2.14 | 4 |
| Example 11 | 1.36 | 5 |
| Example 12 | 1.29 | 5 |
| Example 13 | 1.87 | 4 |
| Example 14 | 1.55 | 5 |
| Example 15 | 1.42 | 5 |
| Example 16 | 2.16 | 4 |
| Example 17 | 1.33 | 4 |
| Example 18 | 1.27 | 5 |
| Example 19 | 1.81 | 4 |
| Example 20 | 1.28 | 5 |
| Example 21 | 1.39 | 4 |

TABLE 8

Properties of colorant for color filter

| Comparative Examples | Average particle diameter (μm) | BET specific surface area value (m²/g) | Geometrical standard deviation value (—) |
|---|---|---|---|
| Comparative Example 1 | 0.021 | 126.3 | 2.58 |
| Comparative Example 2 | 0.021 | 138.4 | 2.66 |
| Comparative Example 3 | 0.021 | 141.3 | 2.79 |
| Comparative Example 4 | 0.022 | 106.2 | 2.35 |
| Comparative Example 5 | 0.034 | 89.2 | 2.61 |

Properties of colorant for color filter Hue

| Comparative Examples | L* value (—) | a* value (—) | b* value (—) |
|---|---|---|---|
| Comparative Example 1 | 20.63 | 7.21 | −18.14 |
| Comparative Example 2 | 25.96 | −13.14 | −5.14 |
| Comparative Example 3 | 38.96 | 55.66 | 8.14 |
| Comparative Example 4 | 20.32 | 7.64 | −19.14 |
| Comparative Example 5 | 18.32 | 8.64 | −21.62 |

Properties of colorant for color filter

| Comparative Examples | Tinting strength (%) | Hiding power (cm²/g) |
|---|---|---|
| Comparative Example 1 | 100 | 440 |
| Comparative Example 2 | 100 | 420 |
| Comparative Example 3 | 100 | 410 |
| Comparative Example 4 | 102 | 450 |
| Comparative Example 5 | 209 | 620 |

Properties of colorant for color filter

| Comparative Examples | Light resistance (ΔE* value) (—) | Degree of desorption of organic pigment (—) |
|---|---|---|
| Comparative Example 1 | 6.64 | 1 |
| Comparative Example 2 | 6.26 | 1 |
| Comparative Example 3 | 7.68 | 1 |
| Comparative Example 4 | 7.35 | 2 |
| Comparative Example 5 | 7.14 | 2 |

TABLE 9

| Examples | Production of coloring composition Kind of colorant for color filter | Properties of colored film Gloss (%) |
|---|---|---|
| Example 22 | Example 3 | 94 |
| Example 23 | Example 4 | 95 |
| Example 24 | Example 5 | 93 |
| Example 25 | Example 6 | 92 |
| Example 26 | Example 7 | 91 |
| Example 27 | Example 8 | 95 |
| Example 28 | Example 9 | 95 |
| Example 29 | Example 10 | 94 |
| Example 30 | Example 11 | 98 |
| Example 31 | Example 12 | 97 |
| Example 32 | Example 13 | 96 |
| Example 33 | Example 14 | 93 |
| Example 34 | Example 15 | 93 |
| Example 35 | Example 16 | 92 |
| Example 36 | Example 17 | 100 |
| Example 37 | Example 18 | 101 |
| Example 38 | Example 19 | 98 |
| Example 39 | Example 20 | 98 |
| Example 40 | Example 21 | 96 |

Properties of colored film Chromaticity

| Examples | x (—) | y (—) | Y (—) |
|---|---|---|---|
| Example 22 | 0.14 | 0.13 | 7.58 |
| Example 23 | 0.20 | 0.61 | 26.97 |
| Example 24 | 0.40 | 0.18 | 11.02 |
| Example 25 | 0.66 | 0.33 | 7.39 |
| Example 26 | 0.49 | 0.49 | 57.88 |
| Example 27 | 0.15 | 0.13 | 7.60 |
| Example 28 | 0.20 | 0.62 | 26.13 |
| Example 29 | 0.43 | 0.16 | 11.26 |
| Example 30 | 0.14 | 0.12 | 5.49 |
| Example 31 | 0.23 | 0.63 | 21.11 |
| Example 32 | 0.43 | 0.17 | 9.87 |
| Example 33 | 0.13 | 0.13 | 7.51 |
| Example 34 | 0.24 | 0.60 | 25.79 |
| Example 35 | 0.41 | 0.13 | 10.42 |
| Example 36 | 0.15 | 0.11 | 3.45 |
| Example 37 | 0.22 | 0.64 | 15.83 |
| Example 38 | 0.44 | 0.16 | 8.70 |
| Example 39 | 0.15 | 0.12 | 7.24 |
| Example 40 | 0.23 | 0.59 | 25.29 |

Properties of colored film

| Examples | Light resistance (ΔE* value) (—) | Light transmittance (R) 620 nm (%) | Light transmittance (R) 480 nm (%) |
|---|---|---|---|
| Example 22 | 1.43 | — | — |
| Example 23 | 1.14 | — | — |
| Example 24 | 2.14 | 82 | >1 |
| Example 25 | 1.53 | 84 | >1 |
| Example 26 | 2.14 | — | — |
| Example 27 | 1.33 | — | — |
| Example 28 | 1.73 | — | — |
| Example 29 | 2.12 | 86 | >1 |
| Example 30 | 1.38 | — | — |
| Example 31 | 1.31 | — | — |
| Example 32 | 1.93 | 91 | >1 |
| Example 33 | 1.38 | — | — |
| Example 34 | 1.66 | — | — |
| Example 35 | 2.01 | 93 | >1 |
| Example 36 | 1.32 | — | — |
| Example 37 | 1.21 | — | — |
| Example 38 | 1.66 | 88 | >1 |
| Example 39 | 1.38 | — | — |
| Example 40 | 1.44 | — | — |

TABLE 9-continued

| | Properties of colored film | | | |
|---|---|---|---|---|
| | Light transmittance (G) | | Light transmittance (B) | |
| Examples | 530 nm (%) | 650 nm (%) | 460 nm (%) | 630 nm (%) |
| Example 22 | — | — | 84 | >1 |
| Example 23 | 92 | >1 | — | — |
| Example 24 | — | — | — | — |
| Example 25 | — | — | — | — |
| Example 26 | — | — | — | — |
| Example 27 | — | — | 86 | >1 |
| Example 28 | 91 | >1 | — | — |
| Example 29 | — | — | — | — |
| Example 30 | — | — | 84 | >1 |
| Example 31 | 90 | >1 | — | — |
| Example 32 | — | — | — | — |
| Example 33 | — | — | 84 | >1 |
| Example 34 | 95 | >1 | — | — |
| Example 35 | — | — | — | — |
| Example 36 | — | — | 90 | >1 |
| Example 37 | 96 | >1 | — | — |
| Example 38 | — | — | — | — |
| Example 39 | — | — | 89 | >1 |
| Example 40 | 89 | >1 | — | — |

TABLE 10

| Comparative Examples | Production of coloring composition Kind of colorant for color filter | Properties of colored film Gloss (%) |
|---|---|---|
| Comparative Example 6 | Organic pigments B-1 | 68 |
| Comparative Example 7 | Organic pigments G-1 | 67 |
| Comparative Example 8 | Organic pigments R-1 | 61 |
| Comparative Example 9 | Organic pigments R-2 | 60 |
| Comparative Example 10 | Organic pigments Y-1 | 59 |
| Comparative Example 11 | Comparative Example 1 | 69 |
| Comparative Example 12 | Comparative Example 2 | 66 |
| Comparative Example 13 | Comparative Example 3 | 60 |
| Comparative Example 14 | Comparative Example 4 | 70 |
| Comparative Example 15 | Comparative Example 5 | 68 |

| | Properties of colored film Chromaticity | | |
|---|---|---|---|
| Comparative Examples | x (−) | y (−) | Y (−) |
| Comparative Example 6 | 0.15 | 0.11 | 2.98 |
| Comparative Example 7 | 0.21 | 0.65 | 15.05 |
| Comparative Example 8 | 0.44 | 0.17 | 8.42 |
| Comparative Example 9 | 0.67 | 0.33 | 6.37 |
| Comparative Example 10 | 0.51 | 0.47 | 40.36 |
| Comparative Example 11 | 0.16 | 0.12 | 2.91 |
| Comparative Example 12 | 0.22 | 0.60 | 14.96 |
| Comparative Example 13 | 0.45 | 0.20 | 8.04 |
| Comparative Example 14 | 0.16 | 0.10 | 2.87 |
| Comparative Example 15 | 0.17 | 0.06 | 0.73 |

| | Properties of colored film | | |
|---|---|---|---|
| | Light resistance | Light transmittance (R) | |
| Comparative Examples | (ΔE* value) (−) | 620 nm (%) | 480 nm (%) |
| Comparative Example 6 | 7.11 | — | — |
| Comparative Example 7 | 6.34 | — | — |
| Comparative Example 8 | 7.12 | 81 | 5 |
| Comparative Example 9 | 7.66 | 79 | 6 |
| Comparative Example 10 | 9.34 | — | — |
| Comparative Example 11 | 6.23 | — | — |
| Comparative Example 12 | 6.38 | — | — |
| Comparative Example 13 | 7.16 | 69 | 6 |
| Comparative Example 14 | 7.15 | — | — |
| Comparative Example 15 | 8.11 | — | — |

| | Properties of colored film | | | |
|---|---|---|---|---|
| | Light transmittance (G) | | Light transmittance (B) | |
| Comparative Examples | 530 nm (%) | 650 nm (%) | 460 nm (%) | 630 nm (%) |
| Comparative Example 6 | — | — | 76 | 3 |
| Comparative Example 7 | 79 | 6 | — | — |
| Comparative Example 8 | — | — | — | — |
| Comparative Example 9 | — | — | — | — |
| Comparative Example 10 | — | — | — | — |
| Comparative Example 11 | — | — | 72 | 5 |
| Comparative Example 12 | 70 | 7 | — | — |
| Comparative Example 13 | — | — | — | — |
| Comparative Example 14 | — | — | 78 | 4 |
| Comparative Example 15 | — | — | 77 | 3 |

TABLE 11

| Examples and Comparative Examples | Production of color filter Kind of coloring composition for color filter | | |
|---|---|---|---|
| | (R) | (G) | (B) |
| Example 41 | Example 5 | Example 4 | Example 3 |
| Example 42 | Example 5 | Example 7 | Example 3 |
| Example 43 | Example 10 | Example 9 | Example 8 |
| Example 44 | Example 13 | Example 12 | Example 11 |

TABLE 11-continued

| Example 45 | Example 16 | Example 15 | Example 14 |
| Example 46 | Example 19 | Example 18 | Example 17 |
| Comparative Example 16 | Comparative Example 3 | Comparative Example 2 | Comparative Example 1 |
| Comparative Example 17 | Comparative Example 3 | Comparative Example 2 | Comparative Example 4 |
| Comparative Example 18 | Comparative Example 3 | Comparative Example 2 | Comparative Example 5 |

| Examples and Comparative Examples | Properties of color filter | | |
|---|---|---|---|
| | Light transmittance (R) 620 nm (%) | Light transmittance (G) 530 nm (%) | Light transmittance (B) 460 nm (%) |
| Example 41 | 86.3 | 87.2 | 86.3 |
| Example 42 | 87.1 | 86.6 | 84.9 |
| Example 43 | 90.1 | 85.4 | 83.2 |
| Example 44 | 87.9 | 86.5 | 85.3 |
| Example 45 | 92.1 | 91.3 | 86.9 |
| Example 46 | 92.0 | 89.9 | 86.3 |
| Comparative Example 16 | 68.3 | 66.5 | 66.3 |
| Comparative Example 17 | 64.6 | 65.3 | 66.9 |
| Comparative Example 18 | 69.6 | 65.2 | 66.6 |

What is claimed is:

1. A coloring composition for a color filter, comprising:
   a colorant for a color filter composed of composite particles having an average particle diameter of 0.001 to 1.0 µm and a geometrical standard deviation value of particle diameters of not more than 2.0, and comprising white inorganic particles, a gluing agent coating layer formed on surface of the white inorganic particle and an organic pigment coat formed on the gluing agent coating layer in an amount of 1 to 500 parts by weight based on 100 parts by weight of the white inorganic particles;
   a dispersant; a binder resin; a monomer as a reactive diluent; a polymerization initiator; and a solvent.

2. A coloring composition for a color filter according to claim 1, wherein at least one under-coating material selected from the group consisting of hydroxides of aluminum, oxides of aluminum, hydroxides of silicon and oxides of silicon is disposed between the surface of the white inorganic particle and the gluing agent coating layer.

3. A coloring composition for a color filter according to claim 1, wherein the colorant for a color filter has a hiding power of less than 600 cm$^2$/g and a BET specific surface area value of 1.0 to 1,000 m$^2$/g.

4. A coloring composition for a color filter according to claim 1, wherein the amount of the colorant for a color filter blended is 5 to 400 parts by weight based on 100 parts by weight of the total amount of the binder resin and the monomer.

5. A coloring composition for a color filter, comprising:
   a colorant for a color filter composed of composite particles having an average particle diameter of 0.0015 to 0.5 µm, a geometrical standard deviation value of particle diameters of not more than 1.8 and a BET specific surface area value of 1.5 to 750 m$^2$/g, and comprising white inorganic particles, a gluing agent coating layer formed on surface of the white inorganic particle, and an organic pigment coat formed on the gluing agent coating layer in an amount of 10 to 400 parts by weight based on 100 parts by weight of the white inorganic particles;
   a dispersant; a binder resin; a monomer as a reactive diluent; a polymerization initiator; and a solvent.

6. A color filter having pixcel obtained by applying the coloring composition for a color filter as defined in claim 1 onto a substrate.

7. A color filter according to claim 6, wherein a maximum light transmittance at each color transmission region is not less than 70%.

8. A method of using as a colorant for a color filter, composite particles having an average particle diameter of 0.001 to 1.0 µm, and geometrical standard deviation value of particle diameters of not more than 2.0, and comprising white inorganic particles, a gluing agent coating layer formed on surface of the white inorganic particle and an organic pigment coat formed on the gluing agent coating layer in an amount of 1 to 500 parts by weight based on 100 parts by weight of the white inorganic particles.

9. A method according to claim 8, wherein at least one under-coating material selected from the group consisting of hydroxides of aluminum, oxides of aluminum, hydroxides of silicon and oxides of silicon is disposed between the surface of the white inorganic particle and the gluing agent coating layer.

10. A colorant for a color filter comprising:
    composite particles having an average particle diameter of 0.001 to 1.0 µm, and a geometrical standard deviation value of particle diameters of not more than 2.0, and comprising white inorganic particles, a gluing agent coating layer formed on surface of the white inorganic particle and an organic pigment coat formed on the gluing agent coating layer in an amount of 1 to 500 parts by weight based on 100 parts by weight of the white inorganic particles.

11. A colorant for a color filter according to claim 10, wherein at least one under-coating material selected from the group consisting of hydroxides of aluminum, oxides of aluminum, hydroxides of silicon and oxides of silicon is disposed between the surface of the white inorganic particle and the gluing agent coating layer.

12. A coloring composition for a color filter according to claim 1, wherein the colorant for a color filter has a tinting strength of not less than 110% and a light resistance ($\Delta E^*$ value) of not more than 5.0.

13. A color filter according to claim 6, wherein a gloss is not less than 70% and a light resistance ($\Delta E^*$ value) is not more than 5.0.

* * * * *